US011561587B2

(12) United States Patent
Schenone et al.

(10) Patent No.: US 11,561,587 B2
(45) Date of Patent: Jan. 24, 2023

(54) CAMERA AND FLASHLIGHT OPERATION IN HINGED DEVICE

(71) Applicant: Microsoft Technology Licensing, LLC, Redmond, WA (US)

(72) Inventors: Scott D. Schenone, Seattle, WA (US); Otso Joona Casimir Tuomi, Seattle, WA (US); Eduardo Sonnino, Seattle, WA (US); Spencer Lee Davis, Columbus, OH (US); Sergio Eduardo Rodriguez Virgen, Bothell, WA (US); T J Rhoades, Seattle, WA (US); Sean Shiang-Ning Whelan, Seattle, WA (US); Tyler White, Seattle, WA (US); Peter Eugene Hammerquist, Shoreline, WA (US); Panos Costa Panay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 16/719,740

(22) Filed: Dec. 18, 2019

(65) Prior Publication Data

US 2021/0096611 A1 Apr. 1, 2021

Related U.S. Application Data

(60) Provisional application No. 62/909,199, filed on Oct. 1, 2019.

(51) Int. Cl.
*H04N 5/232* (2006.01)
*G06F 1/16* (2006.01)
(Continued)

(52) U.S. Cl.
CPC .......... *G06F 1/1681* (2013.01); *G06F 1/1641* (2013.01); *H04N 5/232* (2013.01);
(Continued)

(58) Field of Classification Search
CPC .... G06F 1/1681; G06F 1/1641; G06F 1/1618; G06F 1/1647; G06F 1/1652;
(Continued)

(56) References Cited

U.S. PATENT DOCUMENTS

| 6,069,648 A | * | 5/2000 | Suso | ...................... | H04N 7/142 |
| | | | | | 348/14.02 |
| 7,536,650 B1 | | 5/2009 | Robertson et al. | | |

(Continued)

FOREIGN PATENT DOCUMENTS

| CN | 106681641 A | 5/2017 |
| CN | 107040719 A | 8/2017 |

(Continued)

OTHER PUBLICATIONS

"International Search Report and Written Opinion Issued in PCT Application No. PCT/US2020/042434", dated Dec. 21, 2020, 24 Pages.

(Continued)

*Primary Examiner* — Nelson D. Hernández Hernández
(74) *Attorney, Agent, or Firm* — Alleman Hall Creasman & Tuttle LLP

(57) ABSTRACT

One example provides a computing device including a first portion including a first display, a second portion including a second display and a camera, the second portion connected to the first portion via a hinge, a hinge angle sensing mechanism including one or more sensors, a logic device, and a storage device holding instructions executable by the logic device to execute a camera application and to receive sensor data from the one or more sensors, based at least in part on the sensor data received from the one or more sensors, determine a device pose, output the camera application to the first display when the device pose is indicative of the camera being world-facing, and output the camera (Continued)

application to the second display when the device pose is indicative of the camera being user-facing.

13 Claims, 26 Drawing Sheets

(51) Int. Cl.
*H04N 21/47* (2011.01)
*H04N 21/431* (2011.01)
*H04N 5/235* (2006.01)
*H04M 1/02* (2006.01)

(52) U.S. Cl.
CPC ......... *H04N 5/235* (2013.01); *H04N 21/4316* (2013.01); *H04N 21/47* (2013.01); *H04M 1/0214* (2013.01)

(58) Field of Classification Search
CPC . G06F 1/1677; G06F 1/1686; H04N 21/4316; H04N 5/22525; H04N 5/23225; H04N 5/232933; H04N 5/232; H04N 5/235; H04N 5/232935; H04N 21/47; H04M 1/0214; H04M 1/0243; H04M 2250/52; G03B 2217/002; G03B 30/00
See application file for complete search history.

(56) References Cited

U.S. PATENT DOCUMENTS

| | | | |
|---|---|---|---|
| 8,194,001 B2 | 6/2012 | Miller et al. | |
| 8,330,347 B2 | 12/2012 | Kee et al. | |
| 8,504,936 B2 | 8/2013 | Gimpl et al. | |
| 8,599,106 B2 | 12/2013 | Gimpl et al. | |
| 8,890,802 B2 | 11/2014 | Case, Jr. et al. | |
| 9,207,717 B2 | 12/2015 | Sirpal et al. | |
| 9,489,078 B2 | 11/2016 | Seo et al. | |
| 9,524,030 B2 | 12/2016 | Modarres et al. | |
| 10,048,827 B2 | 8/2018 | Gimpl et al. | |
| 10,204,592 B1 | 2/2019 | Trim et al. | |
| 10,291,873 B2 | 5/2019 | Hattar et al. | |
| 10,306,060 B1 | 5/2019 | Ellis et al. | |
| 2006/0107226 A1 | 5/2006 | Matthews et al. | |
| 2010/0321275 A1 | 12/2010 | Hinckley et al. | |
| 2011/0003587 A1 | 1/2011 | Belz et al. | |
| 2011/0143769 A1 | 6/2011 | Jones et al. | |
| 2012/0081309 A1 | 4/2012 | Sirpal et al. | |
| 2012/0084680 A1 | 4/2012 | Gimpl et al. | |
| 2012/0084710 A1 | 4/2012 | Sirpal et al. | |
| 2012/0084720 A1 | 4/2012 | Sirpal et al. | |
| 2012/0117495 A1* | 5/2012 | Sirpal .................. | G06F 1/1616 715/761 |
| 2013/0080956 A1 | 3/2013 | Sirpal et al. | |
| 2013/0321340 A1 | 12/2013 | Seo et al. | |
| 2015/0067550 A1 | 3/2015 | Shin | |
| 2015/0100914 A1 | 4/2015 | Guan | |
| 2015/0365590 A1* | 12/2015 | Ishizuka ................ | G06F 3/017 348/211.99 |
| 2015/0370322 A1 | 12/2015 | Gustafson | |
| 2016/0062792 A1 | 3/2016 | Yuan et al. | |
| 2016/0349974 A1 | 12/2016 | Louch | |
| 2017/0052698 A1 | 2/2017 | Seo et al. | |
| 2018/0129459 A1 | 5/2018 | Sylvan et al. | |
| 2018/0332205 A1 | 11/2018 | Hawthorne et al. | |
| 2019/0042066 A1 | 2/2019 | Kim et al. | |
| 2019/0056844 A1 | 2/2019 | Kang et al. | |
| 2019/0310720 A1 | 10/2019 | Angelevski et al. | |
| 2019/0369830 A1 | 12/2019 | Alonso Ruiz et al. | |
| 2021/0096732 A1 | 4/2021 | Sonnino et al. | |
| 2021/0099570 A1 | 4/2021 | Schenone et al. | |
| 2022/0030104 A1 | 1/2022 | Schenone et al. | |

FOREIGN PATENT DOCUMENTS

| | | |
|---|---|---|
| EP | 2674834 A2 | 12/2013 |
| EP | 3291523 A1 | 3/2018 |
| WO | 2010028406 A1 | 3/2010 |
| WO | 2020080639 A1 | 4/2020 |

OTHER PUBLICATIONS

Henry, "How to Optimize Apps for Folding Devices: Developing for the Multiscreen Form Factor", Retrieved from: https://insights.samsung.com/2019/01/14/how-to-optimize-apps-for-folding-devices-developing-for-the-multiscreen-form-factor/, Jan. 14, 2019, 9 Pages.

Hinckley, et al., "Codex: A Dual Screen Tablet Computer", In Proceedings of the SIGCHI Conference on Human Factors in Computing Systems., Apr. 9, 2009, pp. 1933-1942.

Khalilbeigi, et al., "FoldMe: Interacting with Double-sided Foldable Displays", In the Proceedings of 6th International Conference on Tangible, Embedded and embodied Interaction., Feb. 19, 2012, pp. 33-40.

Patel, "Sprint's Kyocera Echo Dual-creen Android Phone Announced, We Go Handson (update)", Retried from: https://www.engadget.com/2011/02/07/sprints-kyocera-echo-dual-screen-android-phone-announced-we-go/, Feb. 7, 2011, 19 Pages.

Seifert, Dan, "ZTE's Axon M has Two Screens and A Hinge", Retrieved from: https://www.theverge.com/circuitbreaker/2017/10/17/16486484/zte-axon-m-dual-screen-phone-announcement-hands-on, Oct. 17, 2017, 04 Pages.

Spence, Ewan, "Microsoft Confirms Innovative Approach to New Dual-Screened Surface Devices", Retrieved From: https://www.forbes.com/sites/ewanspence/2019/10/13/microsoft-surface-duo-surface-neo-new-leak-feature-specs-patent-dual-screen-hinge/#52a3d5e7462b, Oct. 13, 2019, 3 Pages.

Spoonauer, Mark, "Galaxy Fold Review: The Future Is (Almost) Here", Retrieved from: https://web.archive.org/web/20191001215733/https/www.tomsguide.com/reviews/samsung-galaxy-fold, Oct. 1, 2019, 24 Pages.

"Non Final Office Action Issued in U.S. Appl. No. 16/717,988", dated Aug. 20, 2021, 36 Pages.

"Non-Final Office Action Issued in U.S. Appl. No. 16/717,988", dated Oct. 28, 2020, 24 Pages.

"International Search Report and Written Opinion Issued in PCT Application No. PCT/US2020/042435", dated Oct. 5, 2020, 13 Pages.

"International Search Report and Written Opinion Issued in PCT Application No. PCT/US2020/048965", dated Nov. 16, 2020, 15 Pages.

"Non Final Office Action Issued In U.S. Appl. No. 16/719,802", dated Feb. 16, 2021, 8 Pages.

"Final Office Action Issued In U.S. Appl. No. 16/717,988", dated Feb. 22, 2021, 26 Pages.

"Notice of Allowance Issued in U.S. Appl. No. 16/717,988", dated Apr. 13, 2022, 6 Pages.

* cited by examiner

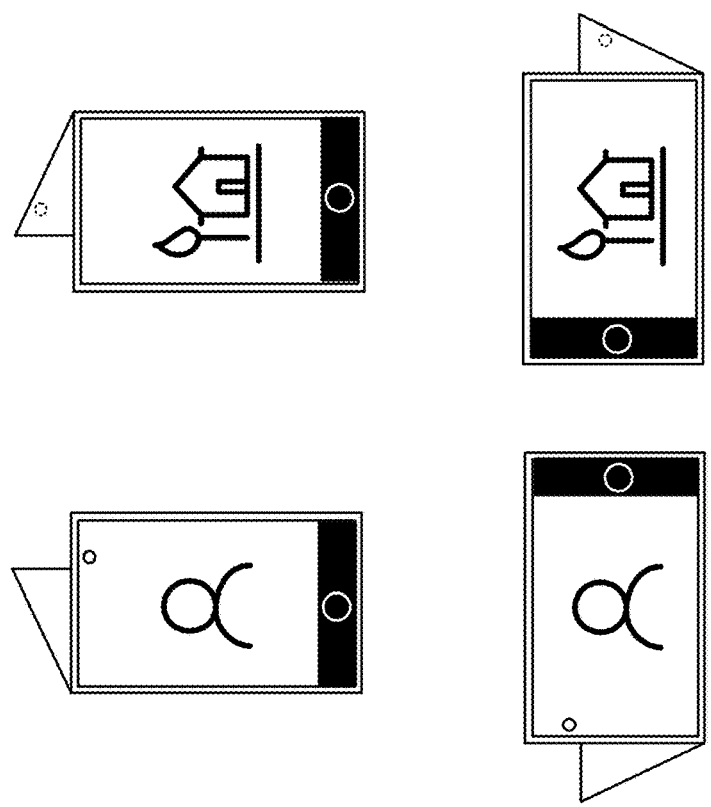
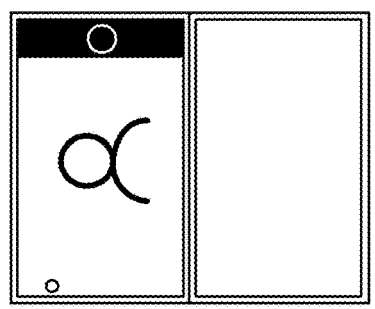
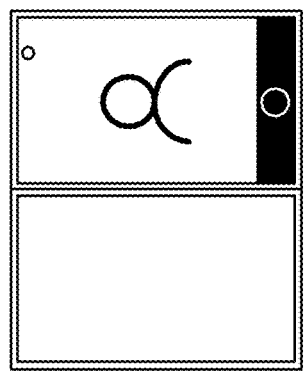
FIG. 3

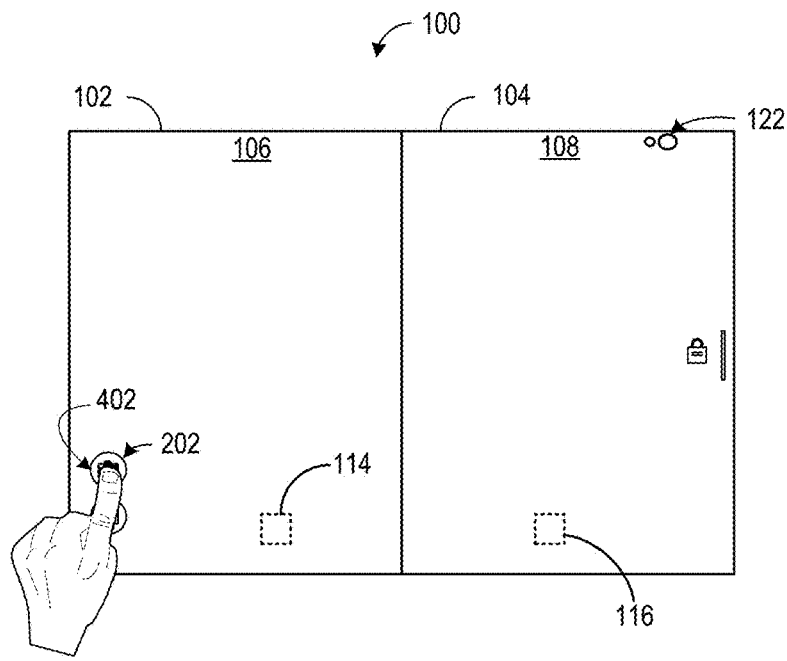 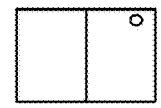
FIG. 4A
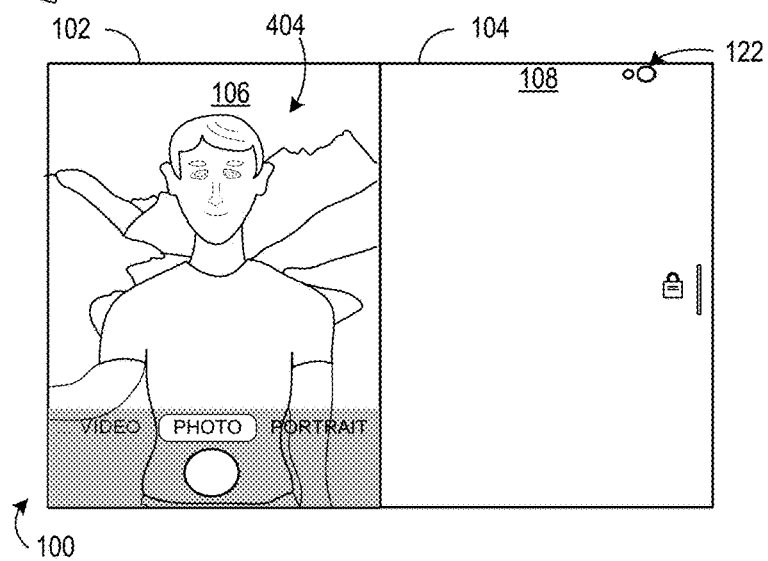 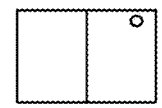
FIG. 4B
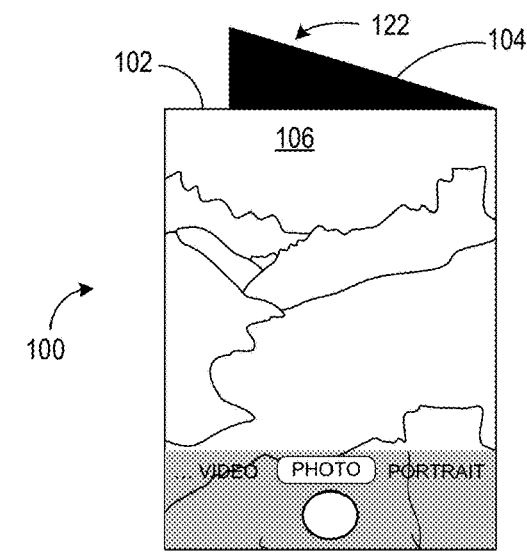 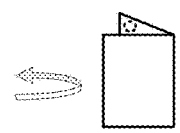
FIG. 4C

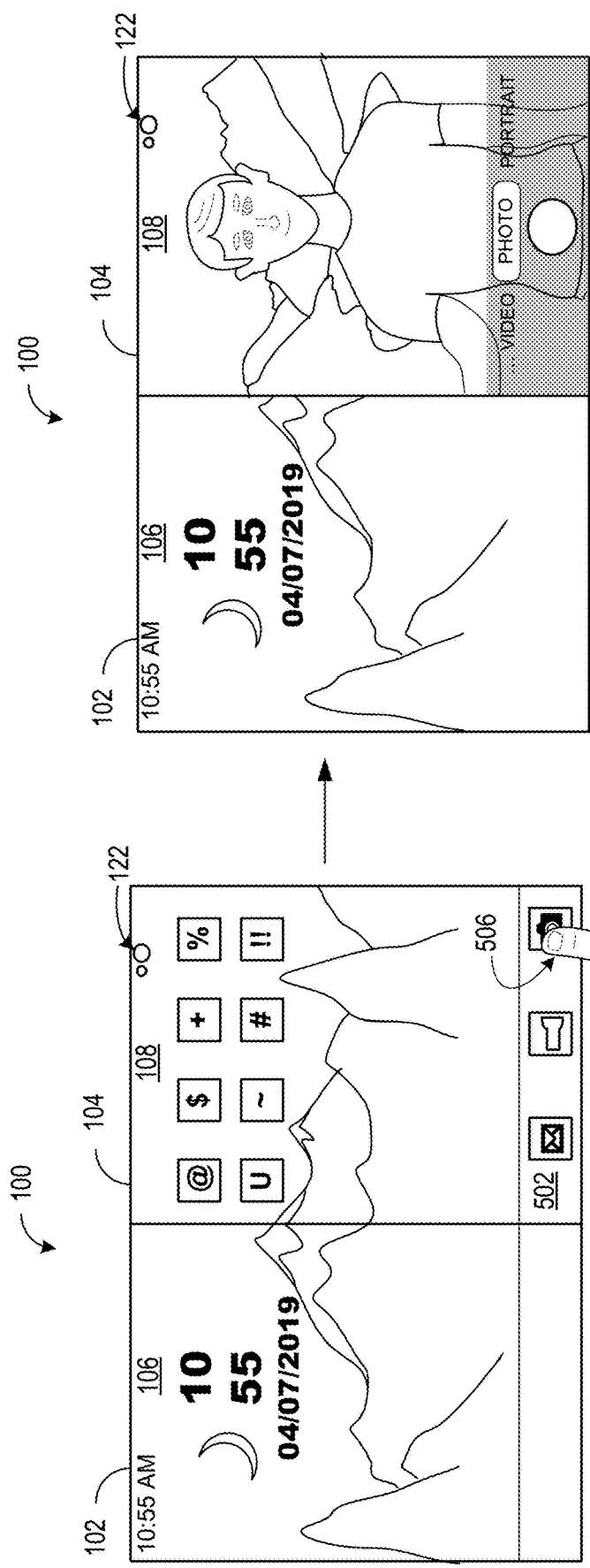

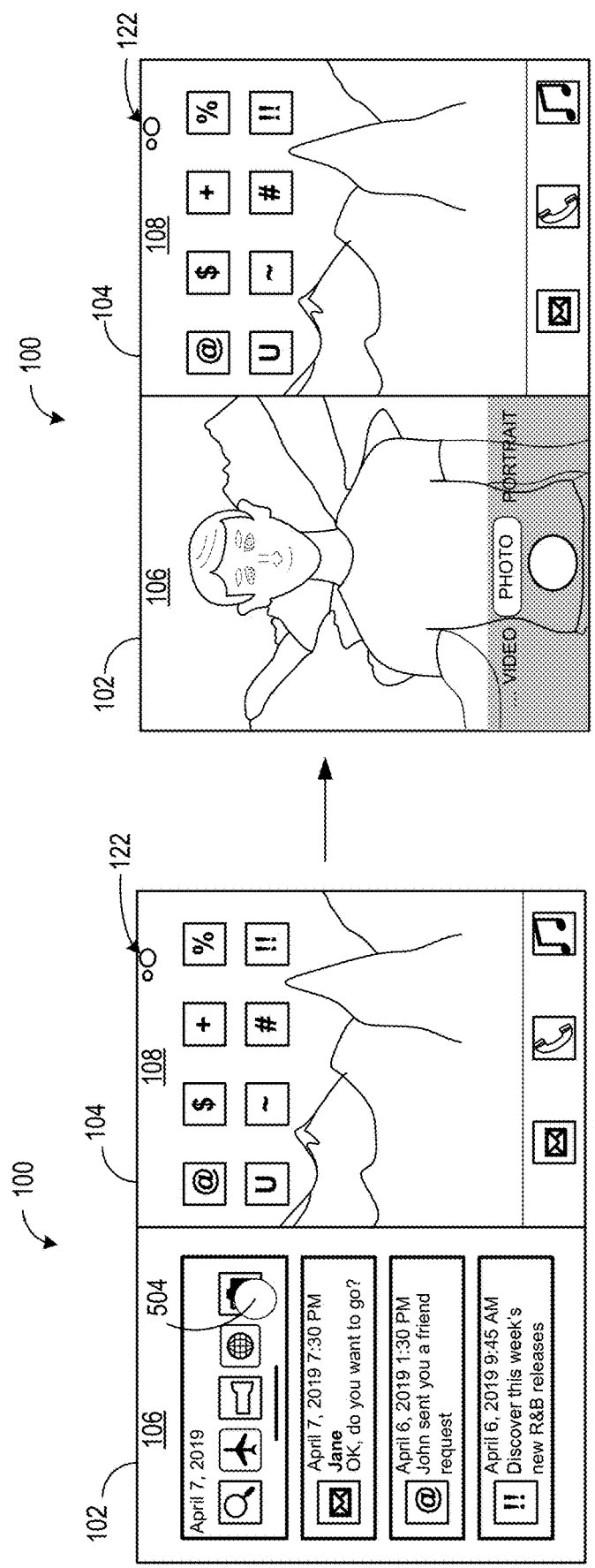

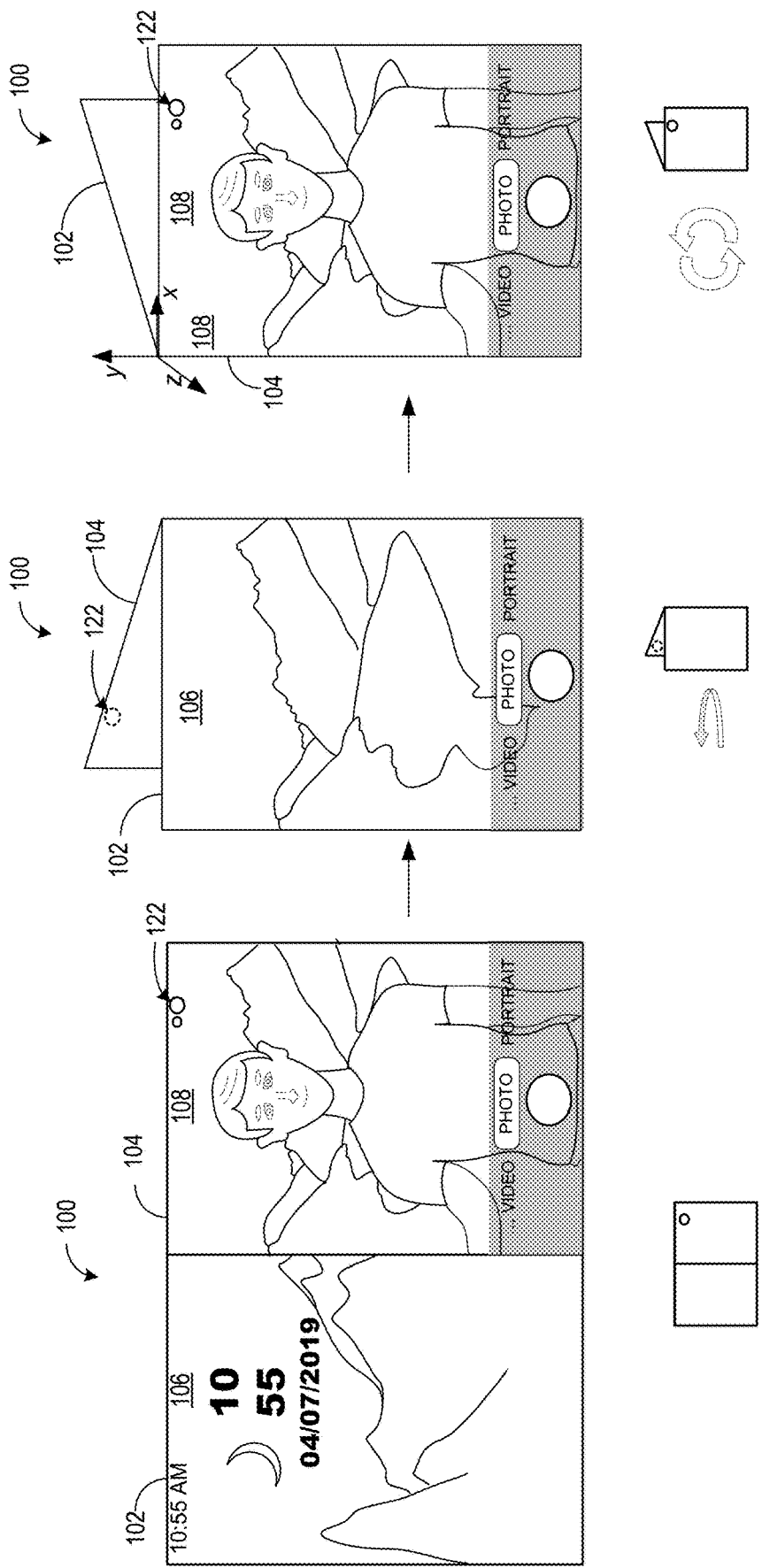

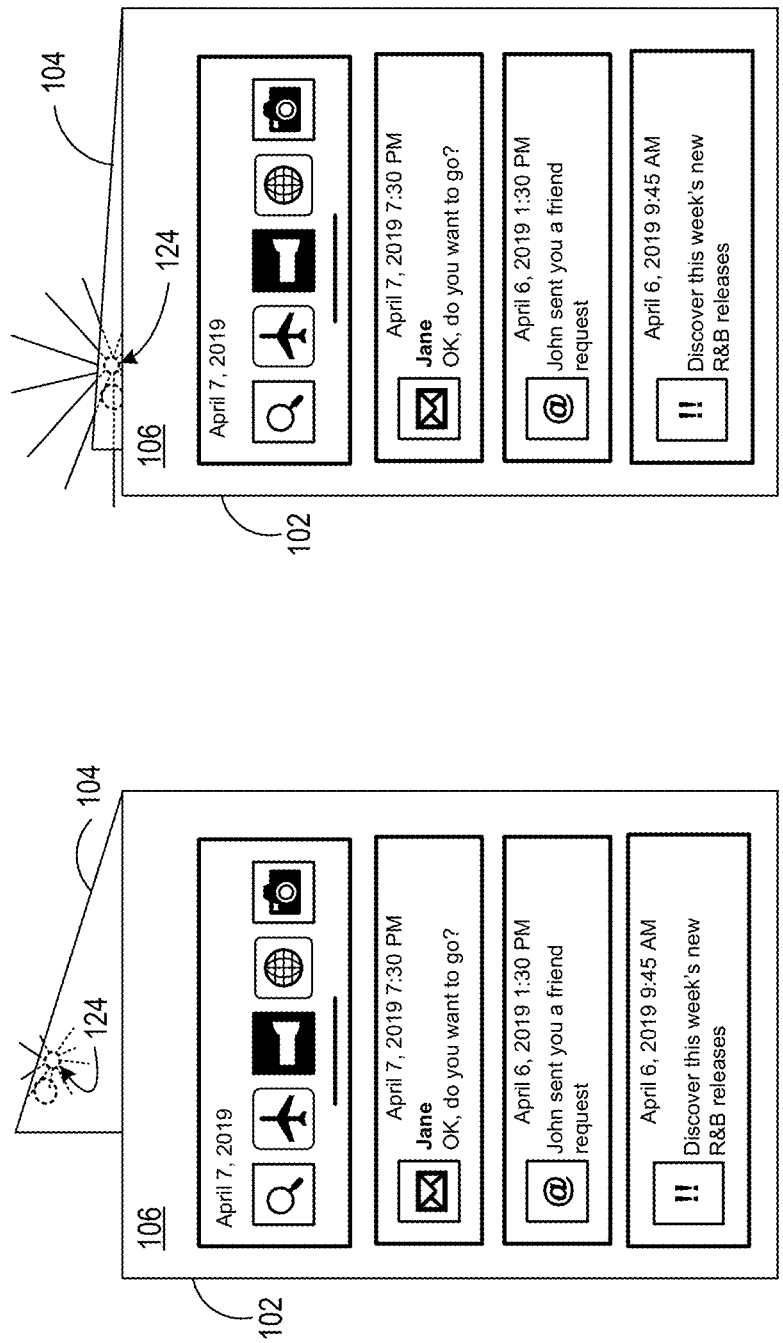

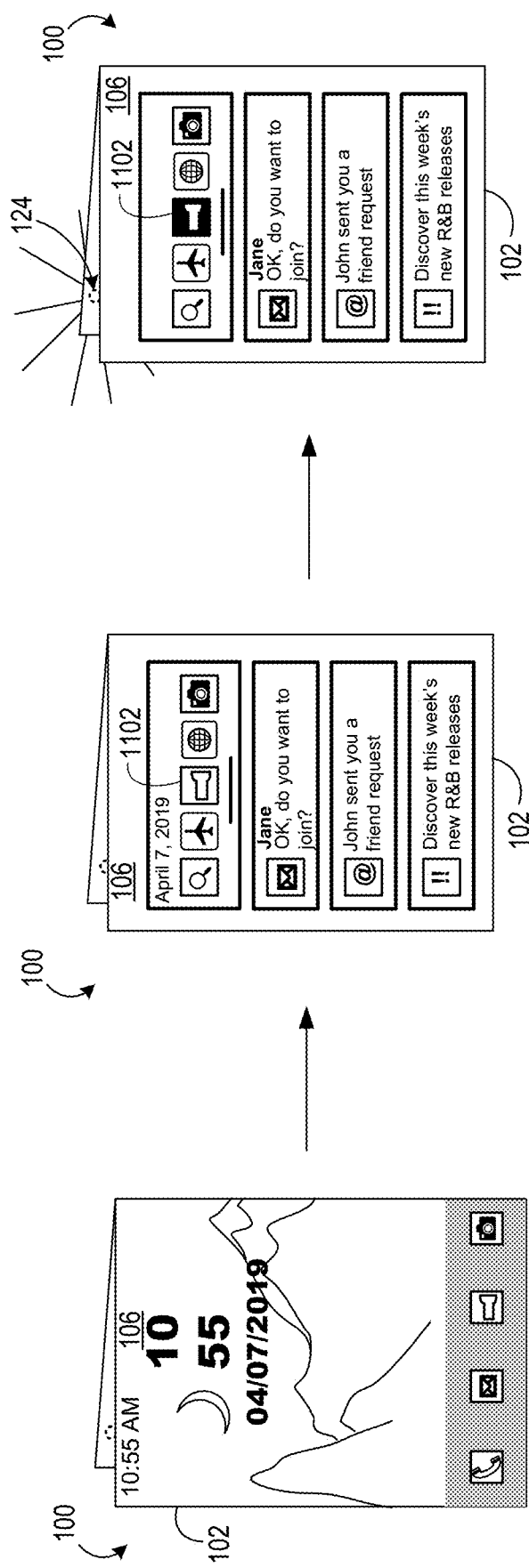

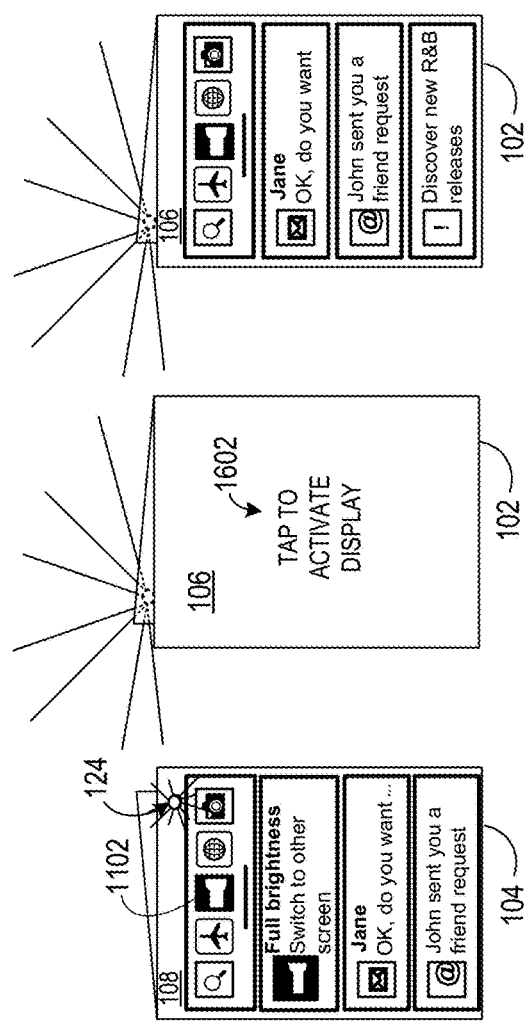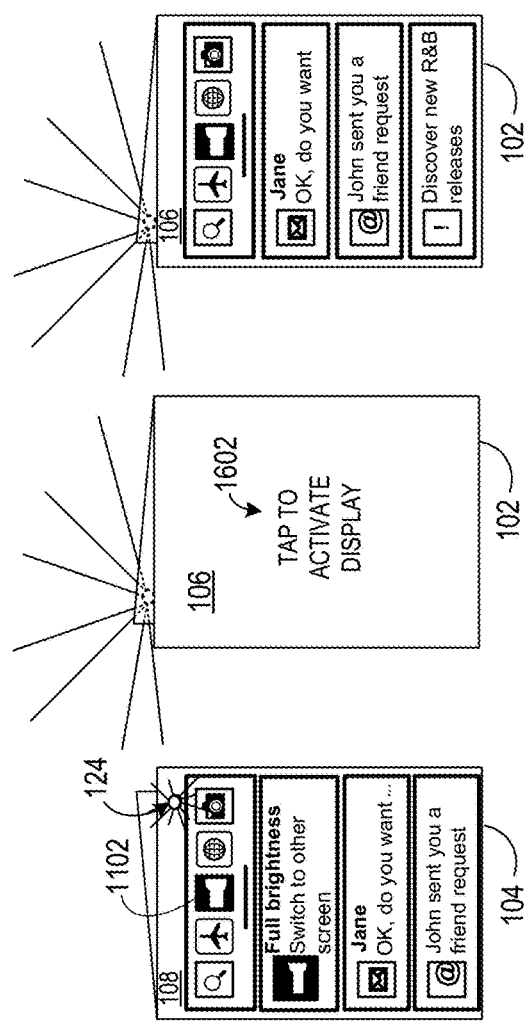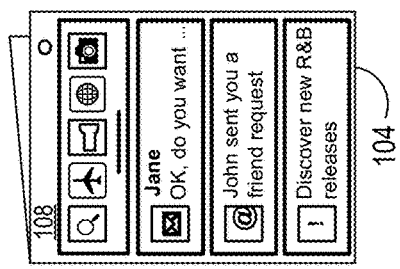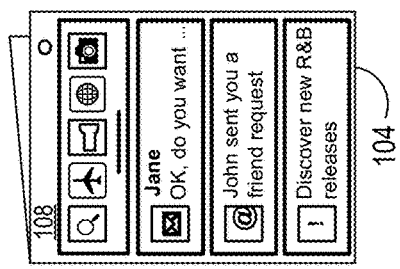

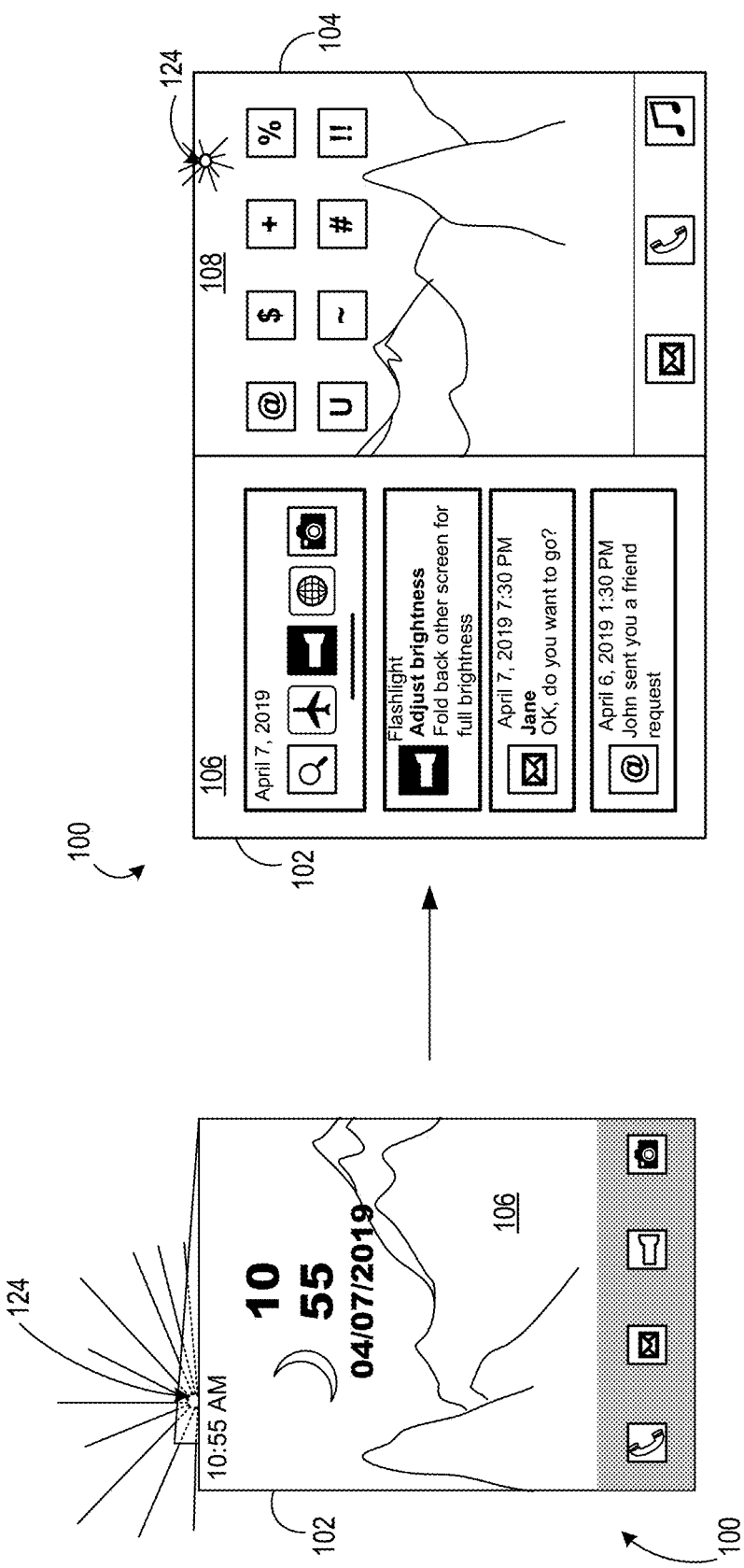

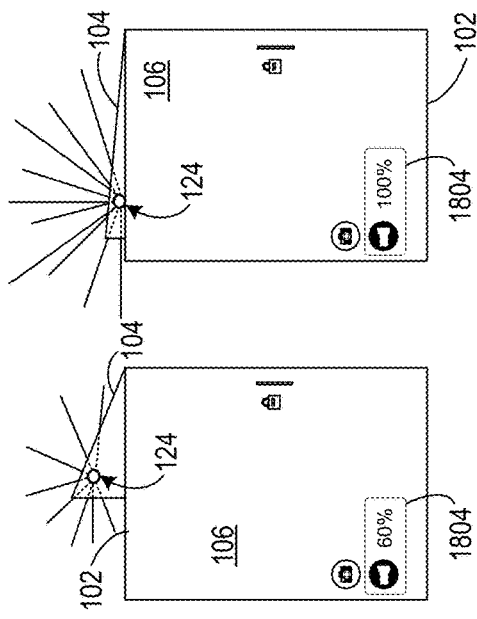
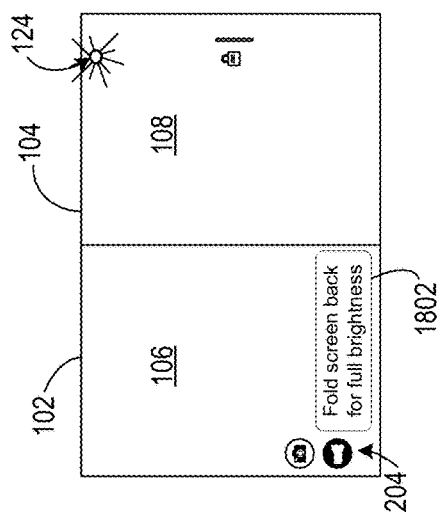
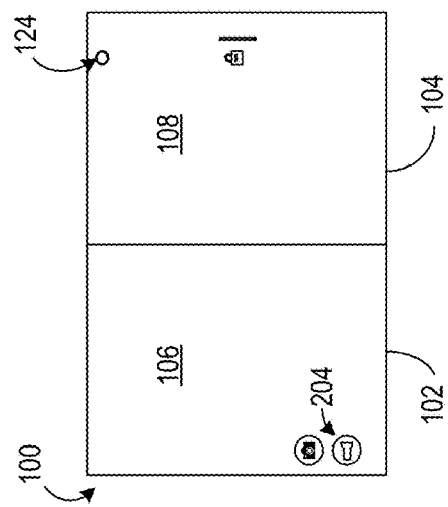
FIG. 18A  FIG. 18B  FIG. 18C  FIG. 18D

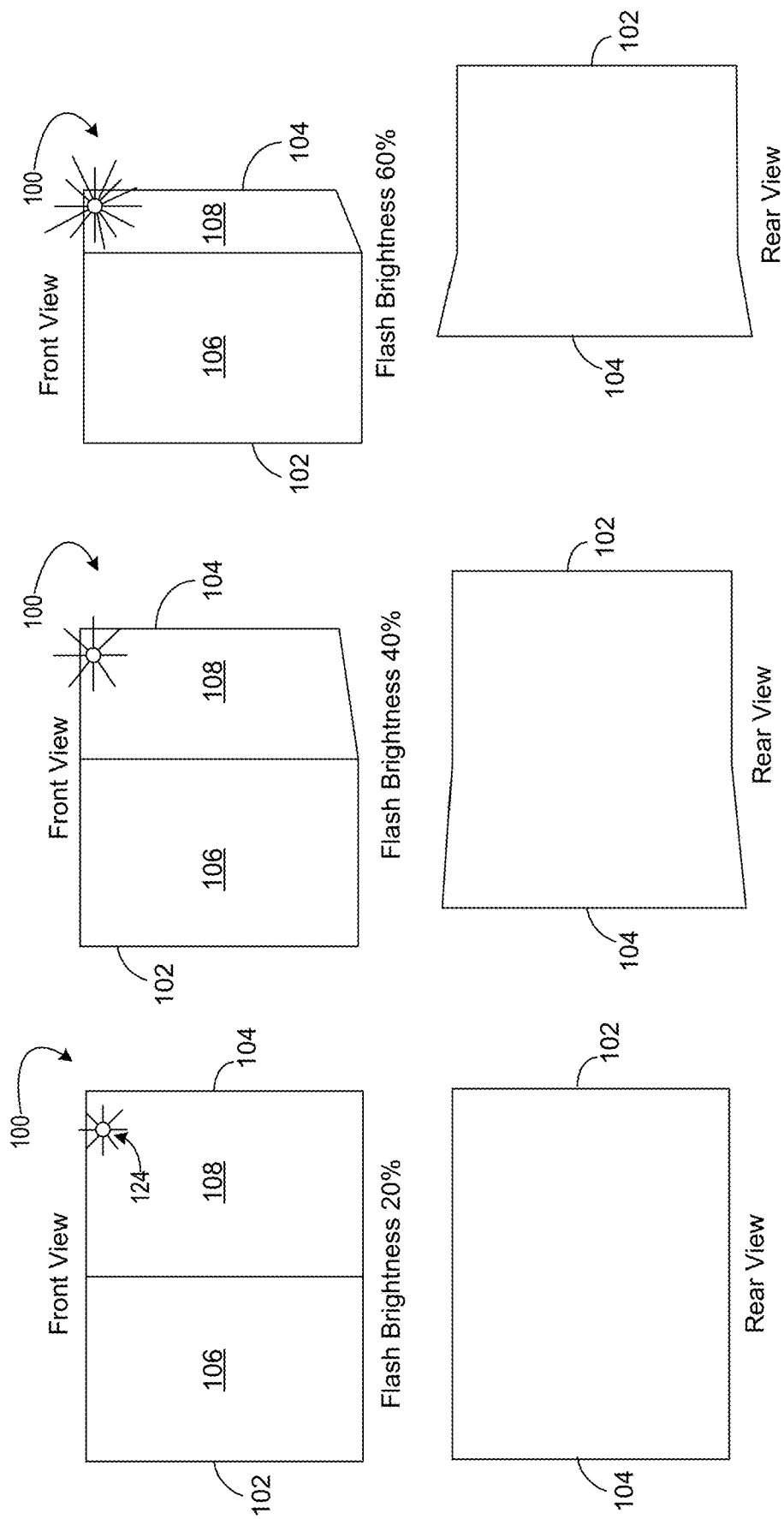

CAMERA AND FLASHLIGHT OPERATION IN HINGED DEVICE

CROSS REFERENCE TO RELATED APPLICATIONS

This application claims priority to U.S. Provisional Patent Application Ser. No. 62/909,199, filed Oct. 1, 2019, the entirety of which is hereby incorporated herein by reference for all purposes.

BACKGROUND

Some mobile electronic devices, such as smart phones and tablets, have a monolithic handheld form in which a display occupies substantially an entire front side of the device. Other devices, such as laptop computers, include a hinge that connects a display to other hardware, such as a keyboard and cursor controller (e.g. a track pad).

SUMMARY

One example provides a computing device including a first portion including a first display, a second portion including a second display and a camera, the second portion connected to the first portion via a hinge, and a hinge angle sensing mechanism including one or more sensors. The computing device further includes a logic device, and a storage device holding instructions executable by the logic device to execute a camera application, to receive sensor data from the one or more sensors, and based at least in part on the sensor data received from the one or more sensors, determine a device pose. The instructions are further executable to output the camera application to the first display when the device pose is indicative of the camera being world-facing, and output the camera application to the second display when the device pose is indicative of the camera being user-facing.

Another example provides a computing device comprising a first portion, a second portion comprising a light source, the second portion connected to the first portion via a hinge, and a hinge angle sensing mechanism comprising one or more sensors. The computing device further includes a logic device, and a storage device holding instructions executable by the logic device to execute a flashlight application, to receive sensor data from the one or more sensors, and based at least in part on the sensor data received from the one or more sensors, determine a pose of the computing device. The instructions are further executable to control the light source to emit light at a relatively lower brightness when the pose of the computing device is indicative of the light source being user-facing, and control the light source to emit light at a relatively higher brightness when the pose of the computing device is indicative of the light source being world-facing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically illustrates example camera user interfaces displayed based upon computing device pose.

FIGS. 4A-4C depicts an example use scenario in which a camera application is launched from a lock screen, followed by the device being moved from a dual display mode to a flip mode.

FIGS. 5A-5G depict example use scenarios in which a camera application is launched from an unlocked state, followed by the device being moved from a dual display mode to a flip mode and then rotated.

FIGS. 13A-13D illustrate the control of a brightness of a flashlight based upon moving the computing device of FIGS. 1A-1F between the double portrait configuration and the flip configuration.

FIGS. 15A-15C illustrate the control of a brightness of the flashlight based upon launching a flashlight application when the flashlight is in an outward-facing orientation.

FIGS. 16A-16E illustrate the control of a brightness of the flashlight based upon moving the flashlight between a user-facing orientation and an outward-facing orientation.

FIGS. 17A-17B illustrates a brightness of a flashlight dimming as an orientation of the flashlight transitions from world-facing to user-facing.

FIGS. 18A-18D illustrate changes in flashlight brightness and a brightness indicator based upon changes in hinge angle of the computing device of FIGS. 1A-1F.

FIGS. 19A-19E illustrate changes in flashlight brightness based upon changes in hinge angle of the computing device of FIGS. 1A-1F.

DETAILED DESCRIPTION

Figure 1A:
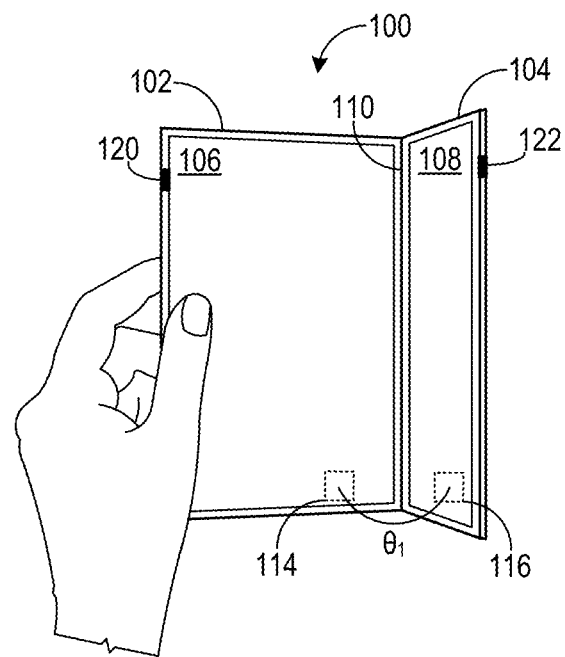
FIGS. 1A-1F show different poses of an example multi-display computing device.

Examples are disclosed that relate to multi-display devices comprising two display portions connected via a hinge, and that relate to the operation of a camera and flashlight of such devices. As described below, an example dual-display device may comprise a camera located on a display-side of one of the portions, and sensor data related to a hinge angle between the display portions may be used as input to control the operation of the camera and/or flashlight. Aspects of controlling the camera include determining on which display to display user interface features, providing for the support of third-party applications that are configured for use with dual front/rear facing camera systems, and controlling flashlight brightness, among other features.

Any suitable sensor configuration may be used to detect the hinge angle. In some implementations, each device portion may include a six degree of freedom (6DOF) motion sensor. Further, the device also may include a sensor that senses a fully closed and/or fully open position, such as a Hall effect sensor on one portion to sense a magnet located on the other portion. Based on data from such sensors, the computing device may determine a likely orientation of the camera relative to the user (e.g. world-facing or user-facing), and output an application user interface, such as a camera stream, user interface controls, etc., based upon a determined computing device pose.

FIGS. 1A-1F show various poses in which an example dual-screen computing device 100 may be held. Computing device 100 includes a first portion 102 and a second portion 104 that respectively include a first display 106 and a second display 108. Each of the first display 106 and the second display 108 may comprise a touch sensor configured to sense touches from digits of users, styluses, and/or other objects.

Figure 1B:
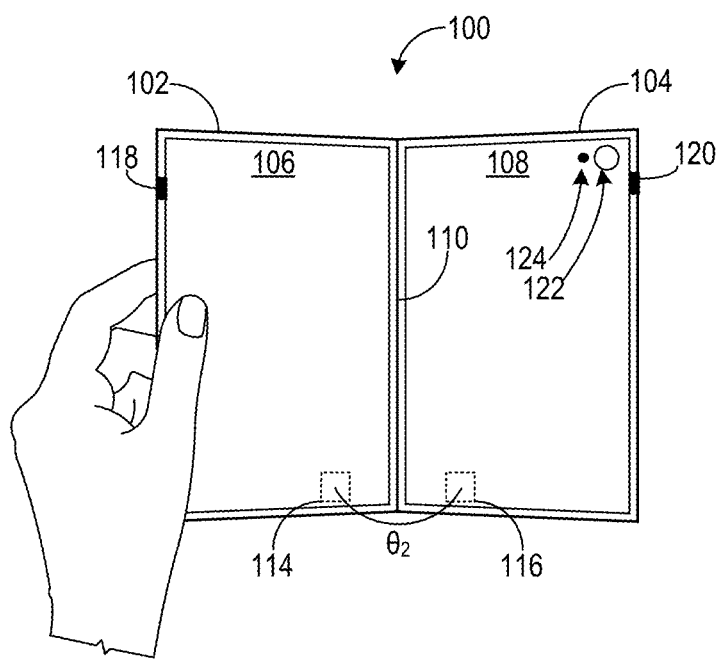

A hinge 110 connecting the first and second portions 102 and 104 allows the relative orientation between the portions and their displays to be adjusted by rotating one or both portions about the hinge 110. This relative orientation is represented in FIGS. 1A-1B by a variable angle θ measured between the emissive surfaces of first and second displays 106 and 108. In the state shown in FIG. 1A, first and second portions 102 and 104 form an acute angle $\theta_1$, whereas in the state shown in FIG. 1B the first and second portions are further rotated away from each other to form a larger angle $\theta_2$.

Figure 1C:
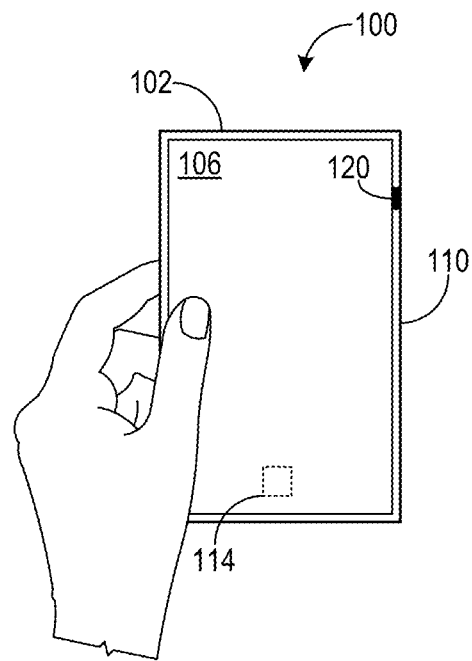

In FIG. 1C, the second portion 104 is folded via hinge 110 behind the first portion 102, such that a display side of each portion faces outward. From the perspective of a user of computing device 100, the second display 108 is imperceptible. In such a configuration, the device may inactivate the display not facing the user. The pose of the computing device 100 in FIG. 1C is referred to herein as a "single portrait" configuration, which in some examples comprises a hinge angle θ within a range of 235 to 360 degrees.

Figure 1D:
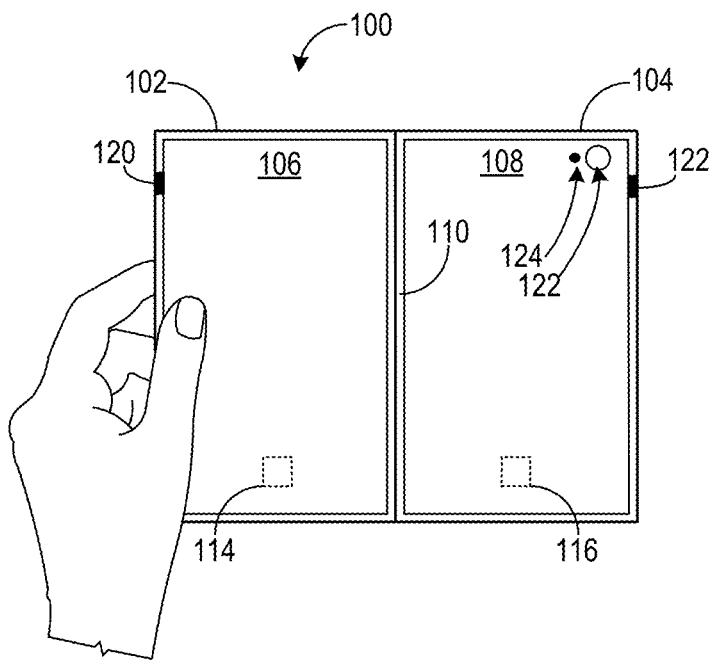

FIG. 1D depicts the computing device 100 after rotating the second portion 180 degrees clockwise from the orientation shown in FIG. 1C. In FIG. 1D, the first and second portions 102 and 104 are oriented in a "double portrait" configuration. First and second portions 102 and 104 may be rotatable throughout any suitable range of angles. For example, the first and second portions 102 and 104 may be rotated in a range up to substantially 360 degrees from a fully open configuration, as shown in FIG. 1C, to a fully closed configuration in which the display side of the first portion 102 faces a display side of the second portion 104.

Figure 1E:
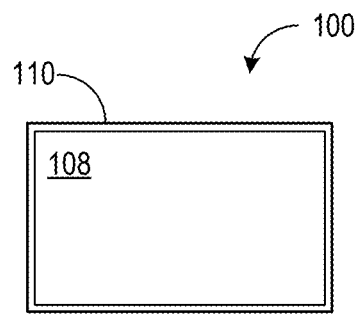
Figure 1F:
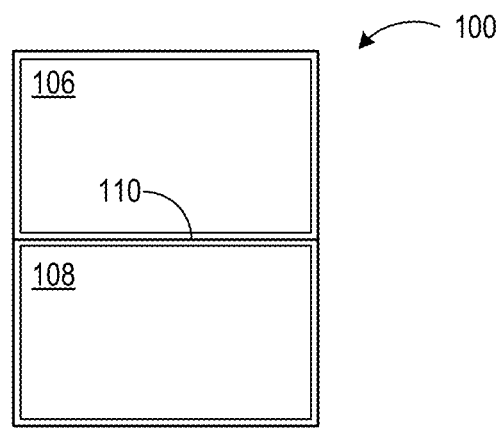

The examples shown in FIGS. 1A-1D each depict the computing device in a portrait orientation. In other examples, the computing device 100 may be used in a landscape orientation. FIG. 1E depicts an example single landscape orientation in which the first display 106 is folded behind (e.g. away from a user holding the computing device 100) the second display 108 via the hinge 110. In such a configuration, either display may face the user and be active. Further, in such a configuration, the display not facing the user may be inactive. FIG. 1F depicts an example double landscape orientation.

As mentioned above, the first portion 102 includes a first 6DOF motion sensor 114 configured to measure the pose of the first portion 102 in six degrees of freedom, namely, x, y, z, pitch, roll, and yaw, as well as accelerations and rotational velocities, so as to track the rotational and translational motion of the first portion 102. Likewise, the second portion 104 includes a second 6DOF motion sensor 116. Any suitable 6DOF motion sensors may be used. For example, the first 6DOF motion sensor 114 and the second 6DOF motion sensor 116 may each include one or more accelerometers and one or more gyroscopes. Additionally, each 6DOF motion sensor 114 and 116 may optionally include a magnetometer. In other examples, any other suitable sensor or sensors may be used to detect the relative orientations of each device portion, such as an optical or mechanical encoder incorporated into the hinge of the device.

Further, as mentioned above, the first and second portions 102 and 104 may include a sensor configured to sense when the first and second portions 102 and 104 are in the closed configuration or fully open configuration (0° or 360° rotation of either portion relative to the other portion). In FIGS. 1A-1D, the sensor takes the form of a Hall effect sensor 120 configured to detect motion of a magnet 122. In other examples, the sensor may comprise an optical sensor, contact switch, or other suitable sensing mechanism. Further, while shown in FIGS. 1A-1F as including first and second displays 106 and 108, computing device 100 may include other numbers of displays. The computing device 100 may take any suitable form, including but not limited to various mobile devices (e.g., a foldable smart phone or tablet).

In FIGS. 1A-1F, the second portion 104 includes a camera 122 and flash 124 located generally at an upper right-hand side of the second display 108. Depending on a configuration and orientation of the computing device 100 (which together may be referred to herein as a pose of the device), the computing device may be configured to display or modify a user interface in a manner adapted to the pose.

Figure 2:
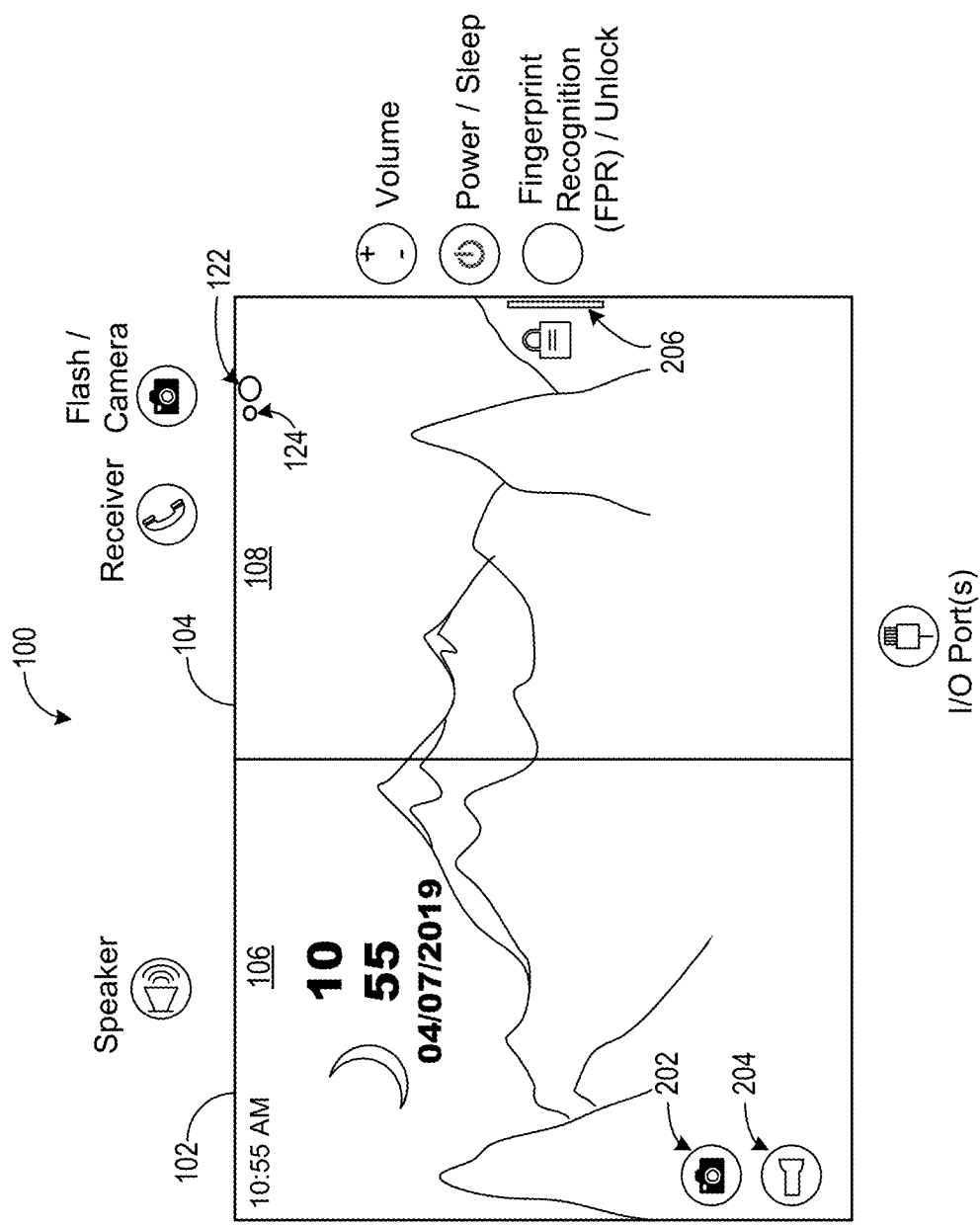
FIG. 2 schematically shows example locations of integrated hardware devices for the computing device of FIGS. 1A-1F.

FIG. 2 shows an example user interface for the computing device 100 of FIGS. 1A-1F when the computing device is in a locked state, and illustrates example locations of integrated device hardware. In this example, the first portion 102 includes a speaker and the second portion 104 includes a camera and flash, as described in more detail below.

In the double portrait configuration shown in FIG. 2, the first display 106 and the second display 108 each are directed towards a user of the computing device 100, and each display 106 and 108 displays aspects of the lock screen user interface. The lock screen user interface includes a first user interface element 202 that is selectable to invoke a camera application. The user interface also includes a second user interface element 204 that is selectable by a user to invoke a flashlight application. When the computing device 100 is in the locked state, the user interface elements 202 and 204 may provide faster access to the camera and flashlight, respectively, compared to unlocking the computing device and navigating to an application launcher.

In the example of FIG. 2, the user interface elements 202 and 204 are displayed on a bottom, left-hand side of the first display 106. As a user may hold the computing device 100 at/around a periphery of the computing device 100, such placement may allow for intuitive selection of a user interface element via touch input without significantly repositioning a hand(s) on the computing device 100.

The lock screen user interface also may include a control 206 to change a lock status of the computing device 100 from the locked state to an unlocked state. For example, the computing device 100 may comprise a fingerprint sensor and corresponding user interface element 206 indicating the location of the fingerprint sensor. The fingerprint sensor may be used to authenticate a user of the computing device 100 and thereby unlock the computing device. In the example of FIG. 2, the fingerprint sensor 206 is located at a periphery of the second display 108, which may allow for convenient placement of a user's right thumb (for example) while a user holds the computing device by the right hand or both hand(s). In other examples, the user interface elements 202, 204 may be displayed in any other suitable location. Likewise, the fingerprint sensor 206 may have any other suitable location. Further, in other examples, a computing device 100 may utilize any other suitable unlock mechanism (e.g., facial recognition) to change the lock state from locked to unlocked.

When a user launches an application configured to access a camera stream of the camera 122 (referred to herein as a "camera application"), the computing device 100 automatically detects a likely orientation and a direction of the camera 122. For example, based on sensor data obtained from the first 6DOF motion sensor and the second 6DOF motion sensor, the computing device 100 may determine a relative orientation and/or motion of the second portion 104 relative to the first portion 102. As the camera 122 is located at a display side of the second portion 104, a direction of the camera may be detected using data obtained from data indicating a likely orientation of the first and second 6DOF motion sensors compared to the user (e.g. based upon recent screen interactions indicating a screen that was likely user facing), and also data indicating a hinge angle between the first portion and the second portion. Based on the orientation and direction detected for the camera, the computing device 100 mirrors or un-mirrors a camera stream of the camera 122. In some examples, mirroring and un-mirroring the camera stream may be determined at an application level, rather than a system level. For example, a camera application may be posture-aware and configured to automatically switch between a user-facing or world-facing camera mode based upon computing device pose, adjusting mirroring accordingly. As another example, a camera application (e.g. a third-party camera application) may mirror the camera stream based on whether a user-facing or world-facing camera mode is active, including in instances that the camera mode does not correspond to device pose. FIG. 3 depicts example camera streams displayed in response to various detected orientations and directions of the camera 122 upon launch of a camera application. In some examples, a user may modify these camera stream configurations, and/or set a desired location and/or orientation a camera stream, for each of one or more selected device poses.

The computing device 100 may output an application user interface (camera stream, user interface elements for operating a camera, etc.) to a specific display(s) based upon a lock state, hinge angle, and/or determined pose (position and/or orientation) of the computing device. FIG. 4A depicts an example use scenario in which a user launches a camera application from a lock screen user interface via a touch input 402 to user interface element 202. Sensor data received from the first 6DOF motion sensor 114 and the second 6DOF motion sensor 116 indicates that the computing device 100 is in a double portrait configuration. In some examples, the computing device 100 may anticipate a possible movement to world-facing image/video capture when the camera application is launched from a lock screen user interface, and output a camera user interface 404 to the first display 106, as shown in FIG. 4B. When a user rotates the second portion 104 counterclockwise while the first portion 102 remains relatively stationary, the camera user interface 102 remains visible and operable to the user without the computing device 100 swapping the application user interface to a different display screen, as shown in FIG. 4C.

In FIG. 4B, the user first poses for a self-portrait in which the camera 122 is oriented in a user-facing direction. In such a device pose, if the user wishes to have the camera application displayed on the second display 108 rather than the first display 106 (such that the user interface is displayed on the device portion that has the camera), the user may manually move the camera application from the first display 106 to the second display 108, e.g. by using a "touch and drag" gesture to select and move the camera application user interface 404 to the second display 108.

FIGS. 5A-5B depict an example use scenario in which a user launches a camera application from an application launcher 502 when the computing device is in an unlocked state. In this example, the application launcher 502 takes the form of a menu bar displayed near a bottom edge of the second display 108. In other examples, an application launcher may take any other suitable form. Further, in some examples, a user may launch an application from a location other than an application launcher 502, and may launch the application from either display screen. In the depicted example, a notification/action center that provides an overview of alerts from computing applications includes a user interface element 504 that is selectable to launch a camera application. As another example, a device home screen also may include an application icon that is selectable to launch the camera application.

Returning to FIG. 5A, user selection of a camera application icon 506 within the application launcher 502 causes the computing device 100 to launch the corresponding camera application. In this example, the camera application launches to the second display 108, which is the same display from which the camera application was invoked, as shown in FIG. 5B. In the example of FIG. 5C, the camera application is invoked from the first display 106 and the camera application launches on the first display, as shown in FIG. 5D.

To facilitate a switch between user- and world-facing camera directions, the computing device 100 is configured to automatically move any application that actively uses the camera 122 to a display that remains user-facing or becomes active (e.g., as a result of becoming user-facing) in the event of a fold, such as to a flip device pose configuration. In FIGS. 5E-5F, a user folds the device into a flip configuration by rotating the second portion 104 to a location behind the first portion 102. The computing device 100 may then determine from motion data that the camera is moving towards a world-facing direction. As a result, the computing device 100 moves the camera application to the first display 106, and also places the second display 108 into an inactive state, as shown in FIG. 5F. In some examples, the computing device 100 detects the flip transition for switching display screens when the hinge angle is greater than or equal to a threshold hinge angle (e.g. 345 degrees). When the computing device 100 detects the flip transition, the application user interface (camera stream, image capture settings, shutter control, etc.) is automatically kept viewable and accessible by a user as the camera 122 is directed away from the user.

Continuing with FIG. 5F, the user then rotates the computing device 100 without changing the hinge angle θ to change the direction of the camera 122 from a world-facing direction to a user-facing direction. Based upon motion data, the computing device 100 moves the application user interface from the first display 106 to the second display 108, as shown in FIG. 5G, thereby automatically keeping the user interface facing toward the user.

Figure 6A:
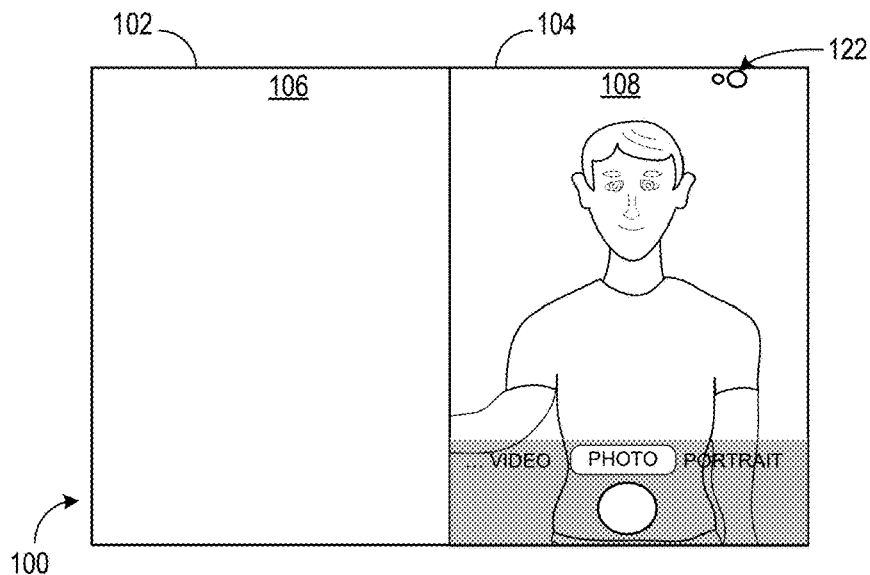
FIGS. 6A-6E depict an example use scenario in which a device is switched from a self-facing camera mode to an outward facing camera mode based upon an angle of a hinge connecting a first portion and a second portion of the computing device and also on a camera orientation relative to a user.
Figure 6B:
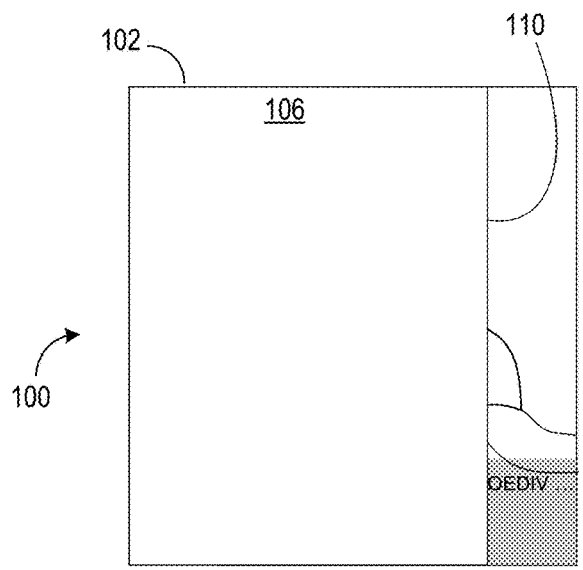
Figure 6C:
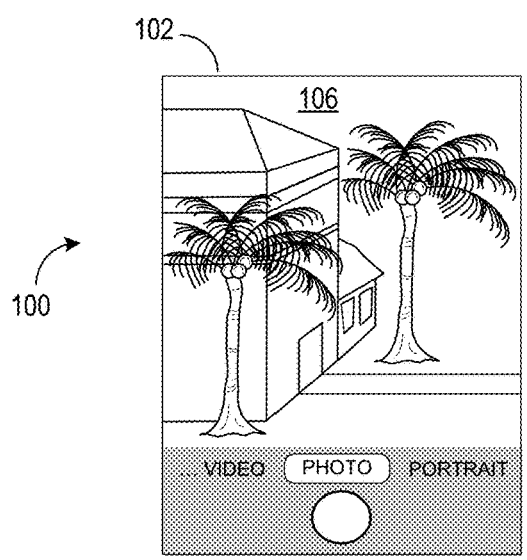
Figure 6D:
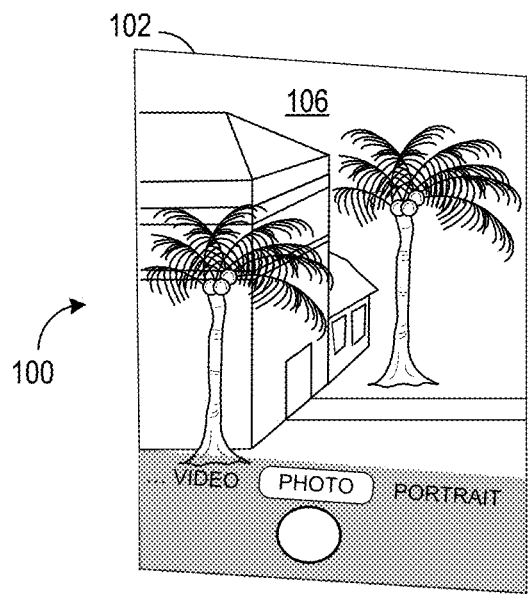
Figure 6E:
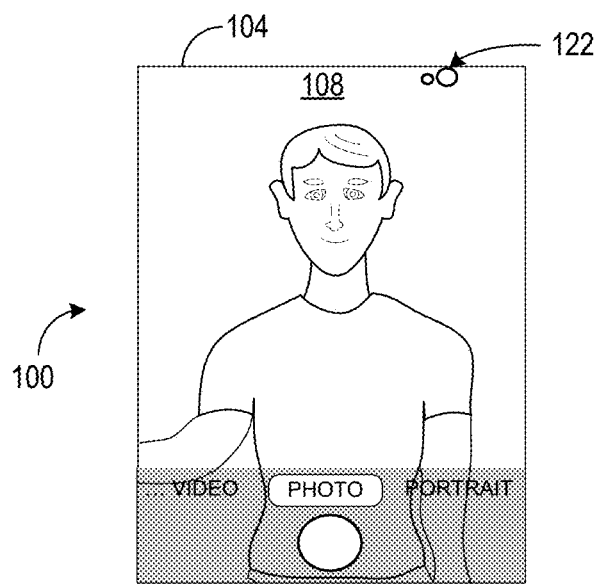

FIGS. 6A-6E illustrate additional examples of automatically moving an application user interface between display screens as a pose of a computing device changes. In FIG. 6A, the computing device is in a double portrait configuration and the camera is in a user-facing direction. In this example, a camera application is output for display on the second display 108. In FIG. 6B, a user folds the second portion 104 to a pose that is behind the first portion 102 from the perspective of the user, e.g. by rotating the second portion 104 counterclockwise about the hinge 110. The computing device automatically detects the pose change based on sensor data. In response, the computing device swaps the camera application user interface from the second display 108 to the first display 106, as shown in FIG. 6C. In FIG. 6D, the user turns the computing device around, such that the camera transitions from a world-facing direction to a user-facing direction. The computing device also detects this pose change based on sensor data, and automatically moves the camera application from the first display 106 to the second display 108 as shown in FIG. 6E.

In the examples of FIGS. 5F-5G and 6D-6E, the camera 122 is active during a detected device flip transition. When the camera 122 is active, a camera stream may automatically move from one display to the other display screen—without user input confirming an intent to switch display screens—in response to a detected device flip transition. In other examples, a user may be prompted to provide input (e.g. touch input, such as a tap or double tap on a display screen), to confirm intent to switch to a different active display screen. This may help to prevent accidental screen switching when the computing device 100 is in a single-screen pose (single portrait or single landscape), for example.

Figure 7A:
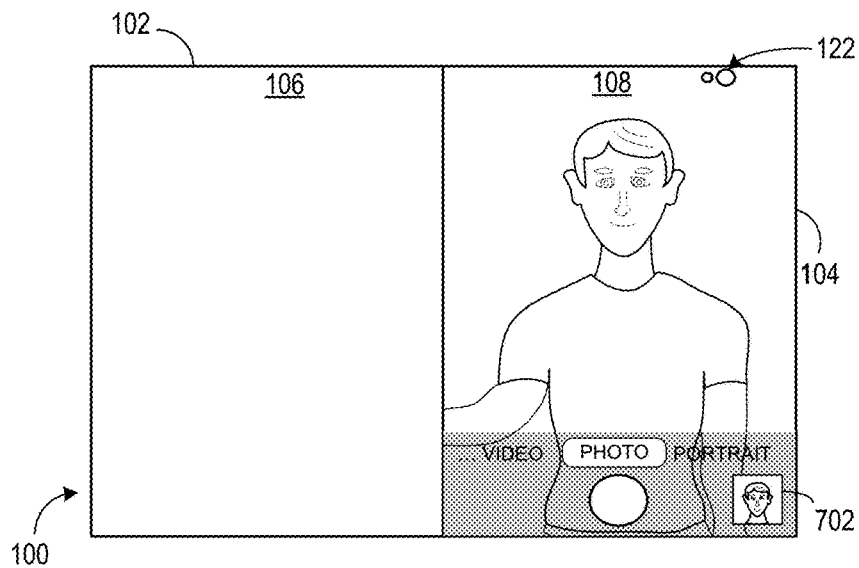
FIGS. 7A-7C illustrate spanning of a camera application across two displays.
Figure 7B:
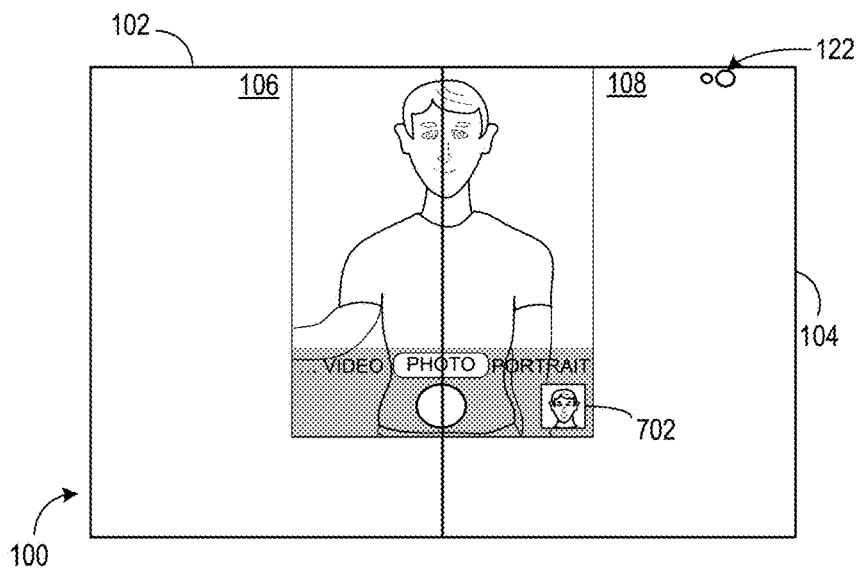
Figure 7C:
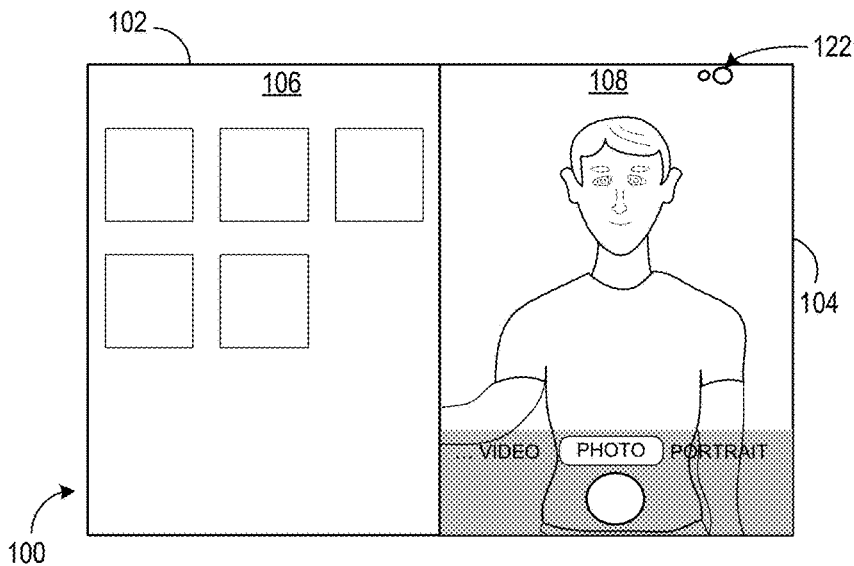

In some examples, a computing device 100 may allow a user to span a computing application user interface across multiple displays. Some applications may not be aware of the multi-screen configuration. In such applications, the spanned view of the application may take the form of a single application user interface window displayed across both displays. Other applications may be multi-screen aware. In such applications, spanning may trigger the display of a multi-screen user interface (UI) mode that is different than the single-screen mode. FIGS. 7A-7C depict an example camera application UI that is multi-screen aware and thus that enters a specific multi-screen mode when spanned. In FIG. 7A, the computing device receives a touch input at the second display, which is currently displaying the camera application in a single screen mode. The touch input drags the camera application towards the first display and releases the application in a particular area, e.g. within a threshold distance of the hinge, as shown in FIG. 7B. In response, the computing device spans the camera application across the first display 106 and the second display 108. As shown in FIG. 7C, in the spanning mode, the camera application displays a UI comprising a collection of thumbnails of recently captured images or videos on the first display 106, and displays the current camera stream on the second display 108. In FIGS. 7A-7B, the second display 108 may switch between displaying a camera stream and displaying a recently captured image(s) upon user input selecting a user interface element 702. In contrast, in the spanning mode shown in FIG. 7C, the computing device displays the camera stream preview and recently captured images on separate display screens simultaneously. As another example, in the spanning mode, the camera application may display a latest image or video capture as occupying a majority of the user interface on the first display 106, and the current camera stream on the second display 108.

Some third-party applications may be configured to select between a front-facing and a rear-facing camera. However, in the depicted examples, the computing device 100 comprises a single physical camera 122. Thus, to accommodate such third-party applications, the computing device 100 may enumerate the physical camera 122 as two virtual cameras when the computing device 100 executes a third-party application. In such an example, based upon a camera mode (e.g., user-facing or world-facing) selected in the third-party application, the third-party application may request to receive data from the virtual camera representing the user-facing camera, or the virtual camera representing the world-facing camera. In response, the computing device provides the stream from the camera to the corresponding virtual camera, which provides the stream to the third-party application.

Figure 8A:
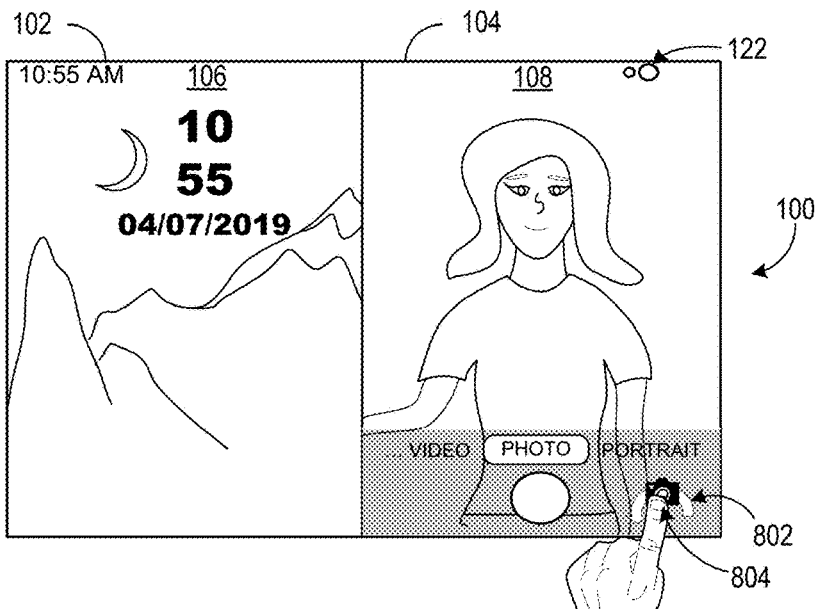
FIGS. 8A-8C illustrate an example use scenario in which a third-party camera application that comprises a control to select between a front-facing camera and a rear-facing camera is operated on the computing device of FIGS. 1A-1F.
Figure 8B:
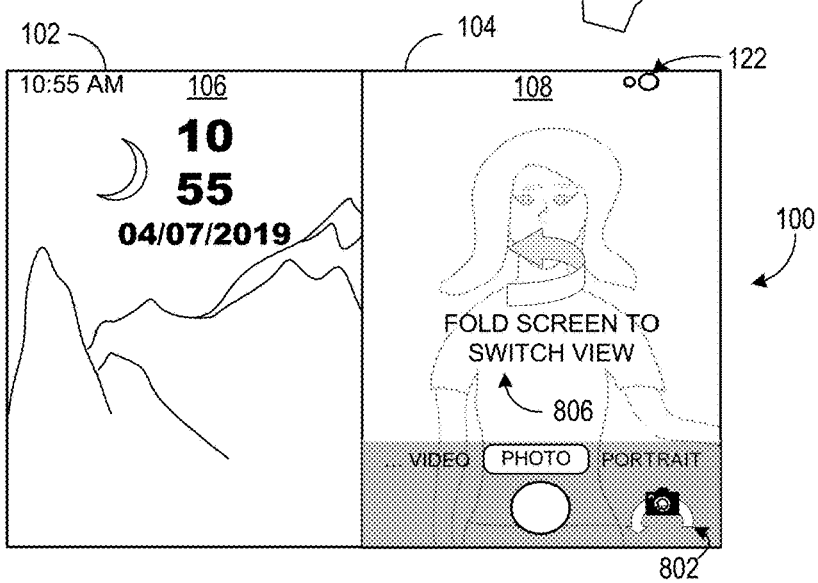
Figure 8C:
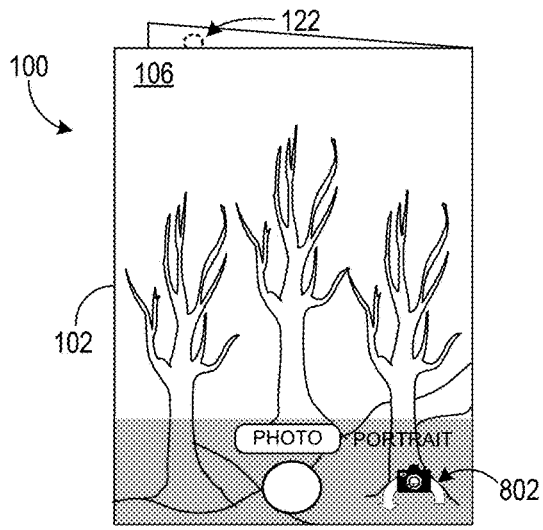

FIGS. 8A-8C depict an example use scenario in which a user launches a third-party application that is configured for front-facing camera and rear-facing camera user experiences. As mentioned above, the application launches on a display screen from which the application was invoked. In this example, the application launches on the second display 108, as shown in FIG. 8A. When the user wants to switch between world-facing and user-facing camera modes, the user selects an in-application user interface toggle 802 via a touch input 804. In response, the computing device 100 presents a notification 806 instructing the user to change a pose of the computing device 100 to complete the switch between camera modes, as shown in FIG. 8B.

A user may change the pose of the computing device in various manners. In FIG. 8B, the user rotates the second portion 104 counterclockwise relative to the first portion 102, until the computing device 100 is in a single portrait configuration shown in FIG. 8C. When sensor data obtained from the first and second 6DOF motion sensors indicates that the user has completed the instructed pose change, the computing device 100 ceases presentation of the notification, and the second display 108 and associated touch sensor may be inactivated while facing away from the user. Further, the computing device 100 outputs the world-facing camera stream to the first display 106.

In some instances, a user may inadvertently select an in-application user interface toggle to switch between rear- and front-facing camera modes, and the computing device may present a notification 806 directing the user to change the computing device pose. The user may undo the request to switch camera modes, and thus dismiss the notification 806, by again selecting the user interface toggle 802.

Some third-party applications also may not be configured to automatically change camera modes based upon changes in device pose. When a change in computing device pose is detected while the computing device runs a third-party application, a computing device 100 may present a notification to alert a user of a detected change in the camera mode. A user of the computing device then may confirm the change in camera mode to dismiss the notification, or may revert the computing device to the prior device pose and keep the camera in the same mode.

Figure 9A:
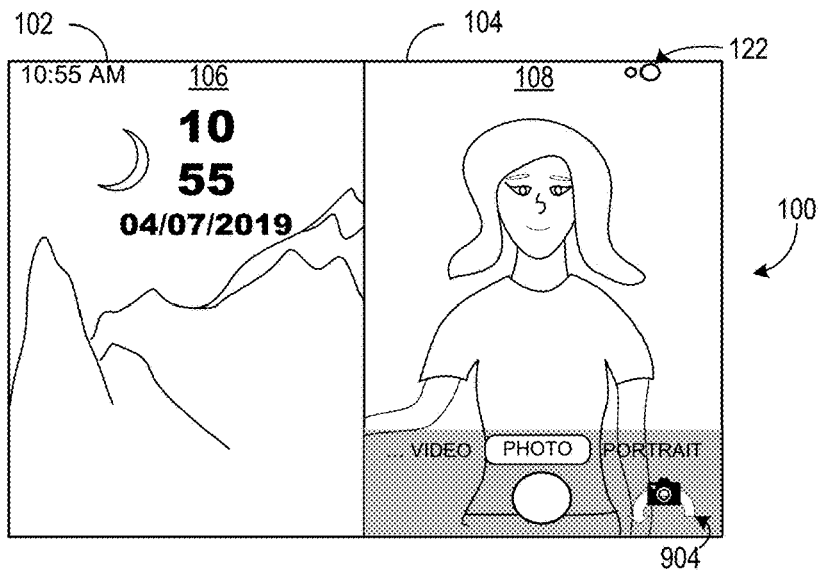
FIGS. 9A-9C illustrate another example use scenario in which a third-party camera application that comprises a control to select between a front-facing camera and a rear-facing camera is operated on the computing device of FIGS. 1A-1F.
Figure 9B:
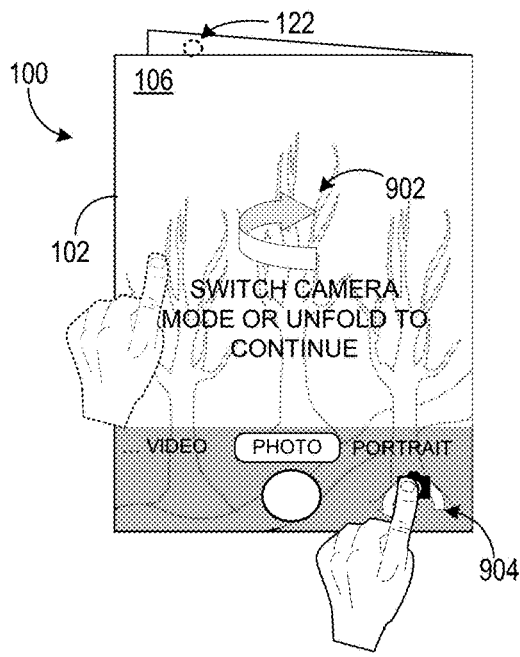
Figure 9C:
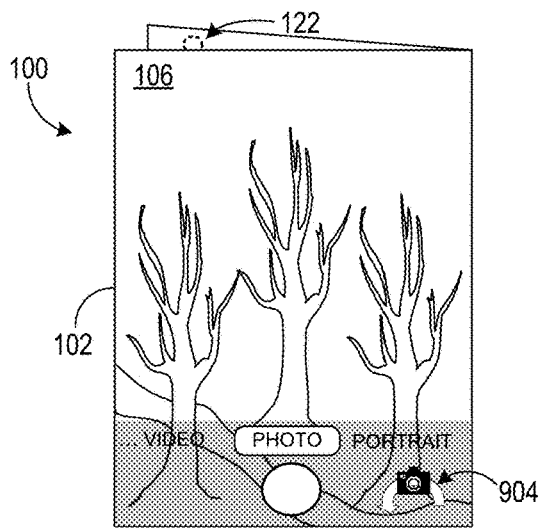

FIGS. 9A-9C depict an example use scenario in which a third-party application that accesses a camera stream of the camera 122 is opened on the second portion 104. After launching the application (FIG. 9A), a user folds the second portion 104 behind the first portion 102, such that the camera 122 is directed away from the user (FIG. 9B). The computing device 100 detects the pose of the second portion 104 relative to the first portion 102 and determines that the pose is indicative of the camera being world-facing, e.g. based upon the data received from the motion sensors on each portion 102 and 104 and also information indicating most recent screen interactions. In response, the computing device 100 presents a notification 902 altering the user to the detected change of camera mode. In some examples, the computing device 100 may present the notification 902 as an overlay stacked on top of the application without dismissing (e.g. closing) the application. In other examples, the computing device 100 may present the notification 902 on a separate display than the application, e.g. to present the notification 902 on a user-facing display when the application is displayed on a world-facing display. In further examples, the computing device 100 may output the notification in any other suitable manner.

To confirm the change in camera mode, the user provides touch input to the computing device 100 by selecting the in-application user interface toggle 904 on the first display 106. In response to receiving user input, the computing device dismisses the notification. As another example, the user provides touch input to the computing device 100 by tapping the first display 106 at a location of the notification 902 with a finger (as shown in dotted lines in FIG. 9B) or stylus. In response to receiving user input, the computing device 100 dismisses the notification 902 and outputs the application to the first display 106 (FIG. 9C). The application also may switch virtual cameras (described above) from which the camera stream is obtained. As another example, the user may manifest intent to change camera modes by touching the first display 106 at an in-application user interface toggle 904 (e.g. while in the pose of FIG. 9A), after which the user may be prompted to flip the camera around to a world-facing view, and after which the application obtains the camera stream from a different virtual camera.

Figure 10:
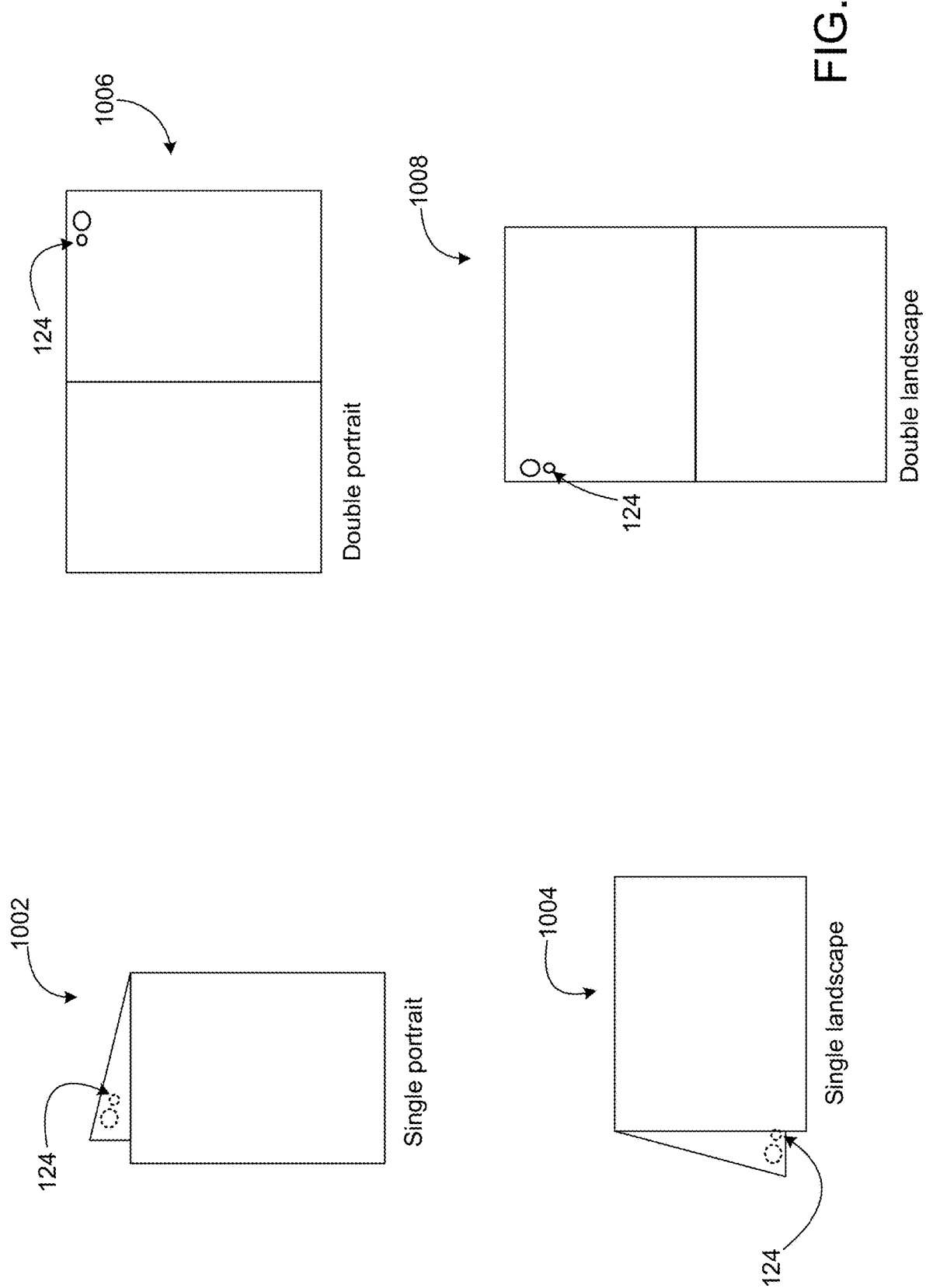
FIG. 10 illustrates example poses of the computing device of FIGS. 1A-1F used to control a flashlight.

As mentioned above, the computing device 100 includes a flash for the camera. The computing device 100 further is configured to operate the flash in a "flashlight mode" that is separate from camera operation. The flash may be utilized as a flashlight in any computing device pose. FIG. 10 depicts use of the flash 124 as a flashlight in single portrait 1002, single landscape 1004, double portrait 1006, and double landscape 1008 poses of a computing device.

A user may invoke the flashlight mode in any suitable manner. As mentioned above with reference to FIG. 2, a lock screen user interface may include a user interface element 204 that is selectable to turn on the flash 124 in a flashlight mode when the computing device is in a locked state. In some examples, the user interface element 208 may be selectable to launch the flashlight mode without providing user credentials to change the lock state.

Figure 11:
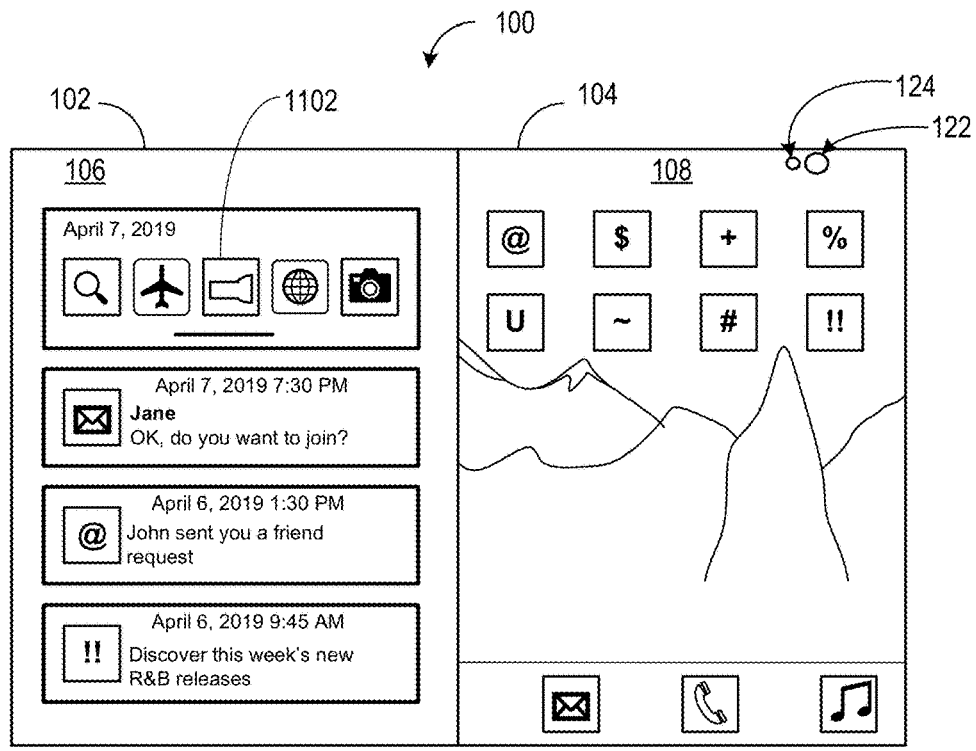
FIG. 11 illustrates an example invocation mechanism for launching a flashlight application.

A user may also invoke the flashlight mode when the computing device 100 is in an unlocked state. For example, the notification/action center that provides an overview of alerts from computing applications may also include a user interface element that is selectable to turn on the camera flash in flashlight mode. FIG. 11 depicts the computing device 100 in an unlocked state. In this example, the computing device 100 displays a notification center via the first display 106 and displays a plurality of application icons via the second display 108, wherein the notification center comprises a flashlight control 1102. In other examples, the computing device 100 may include any other suitable mechanism for launching the flashlight.

In FIG. 11, the user interface element 1102 for controlling operation of the flash as a flashlight is displayed on the first display 106, rather than on the second display that includes the flash. In instances that a user rotates the second portion 104 comprising the flash to direct the flash away from the user, the user interface element 1102 for controlling the flash remains on the first display 106 for convenient user access. In other examples, a flashlight control user interface element 1102 may be invoked from the second display 108.

Figure 12:
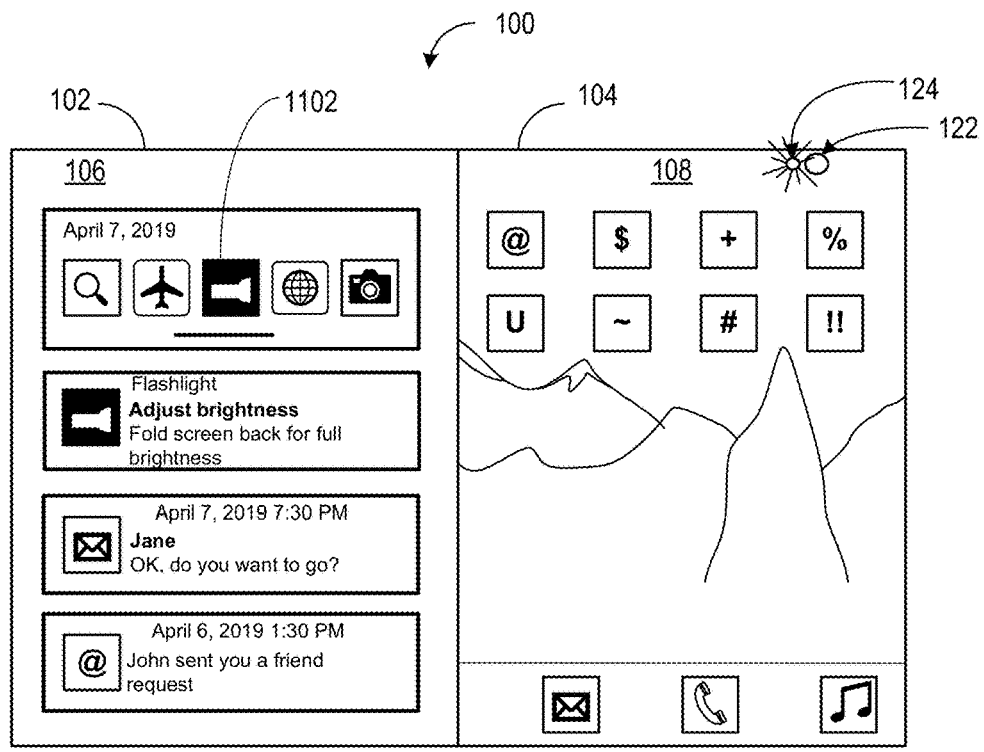
FIG. 12 illustrates an initial brightness of a flashlight when the computing device of FIGS. 1A-1F is in a double portrait configuration.

The flash 124 is in a user-facing direction when the computing device is in a double portrait (or double landscape) configuration. Thus, when launched, the flash 124 initiates at low brightness (e.g., 0-20% of total brightness) as shown in FIG. 12, which may help to prevent eye discomfort in the user-facing pose. As explained in more detail below, a brightness of light emitted by the flash 124 in the flashlight mode may be controlled by the hinge angle, such that the brightness is increased once the hinge angle indicates that the light is likely rotated out of direct view.

Figure 13A:
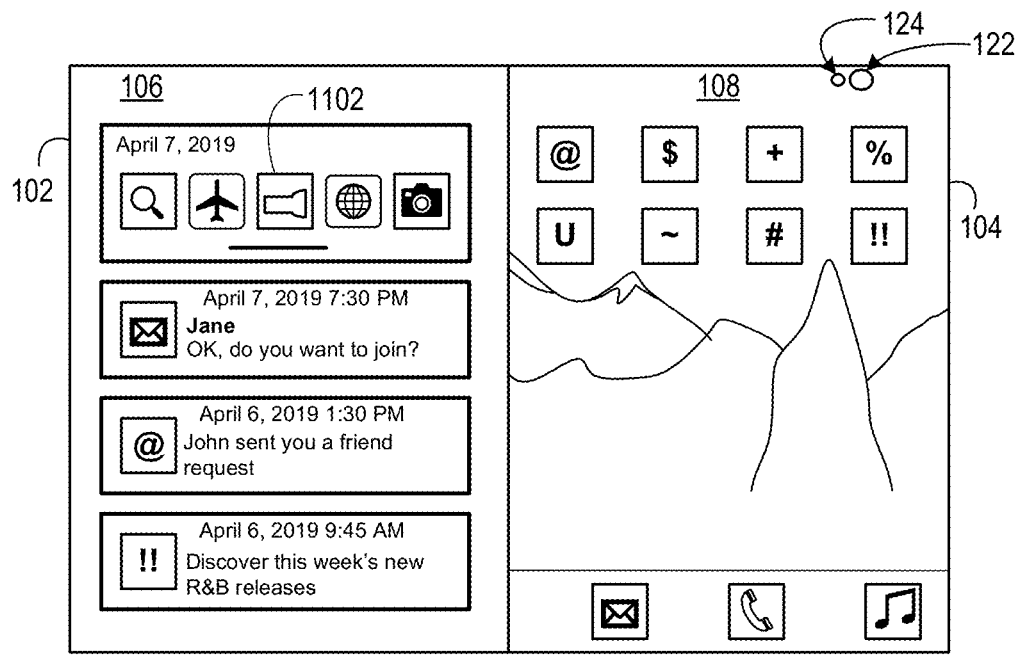
Figure 13B:
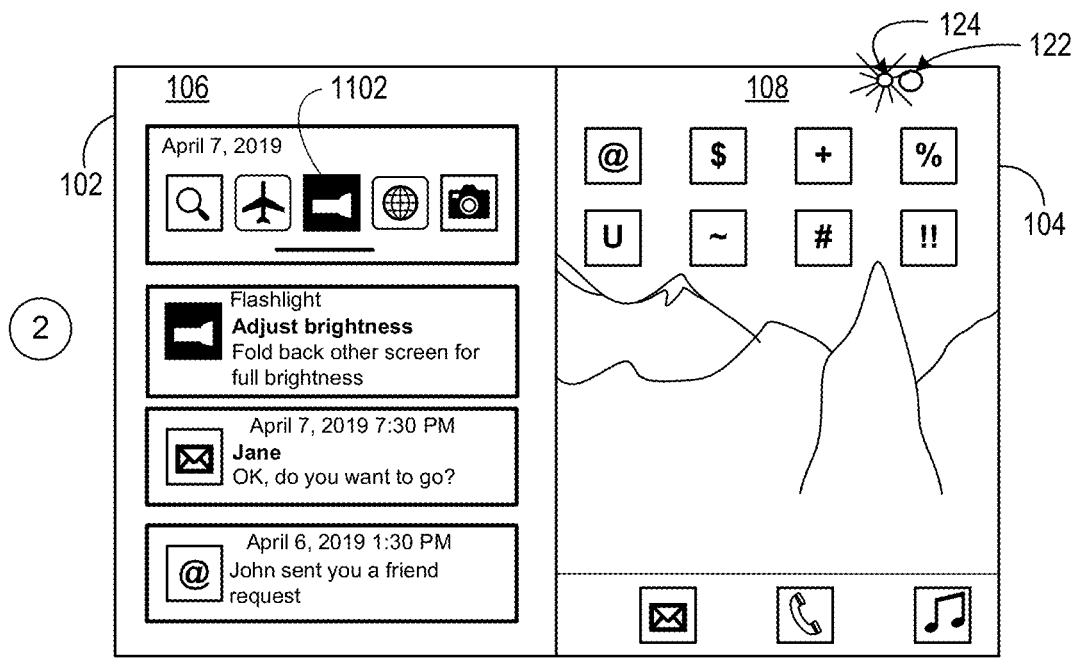

FIGS. 13A-13D depict an example use scenario for operating a flashlight application when a computing device is in a double portrait or a double landscape configuration. At FIG. 13A, the flash is off, and a user navigates to a notification/action center. At FIG. 13B, the user turns on the flashlight by selecting a user interface element 1102 displayed in the notification/action center. In a current user-facing orientation (e.g. as determined based upon motion data obtained from the motion sensors on each portion 102 and 104 also information indicating most recent screen interactions), the flash 124 initiates at a lower brightness (e.g. 0-20% of full brightness). The computing device outputs a notification, e.g. in the notification/action center, instructing the user to adjust flashlight brightness by folding the second portion 104 behind the first portion 102. At FIG. 13C, the user rotates the second portion 104 counterclockwise while a pose of the first portion 102 remains relatively unchanged. The flash 124 emits increasingly brighter light as the hinge angle increases and the flash 124 moves in a direction away from the user. When the second portion 104 is folded behind the first portion 102, as shown at FIG. 13D, the flash emits light at or near full brightness.

As mentioned above, the computing device 100 may be utilized in various other configurations, in addition or alternatively to a double portrait or a double landscape configuration. When the flashlight is invoked and a computing device is in a single portrait (or single landscape) configuration, initial flashlight brightness may be determined based on whether the flash is directed towards a user or the surrounding real-world environment (away from the user). FIGS. 14A-14D depict example use scenarios for launching a flashlight application when a computing device is in a single portrait configuration.

Figure 14A:
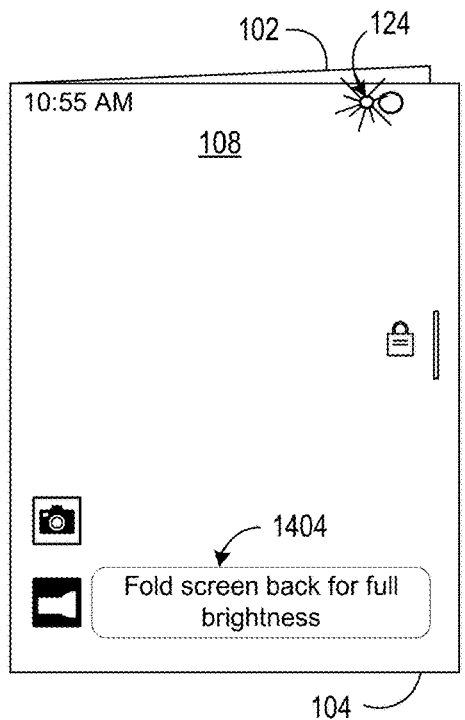
FIGS. 14A-14D illustrate the control of a brightness of the flashlight as a function of flashlight orientation compared to a user.
Figure 14C:
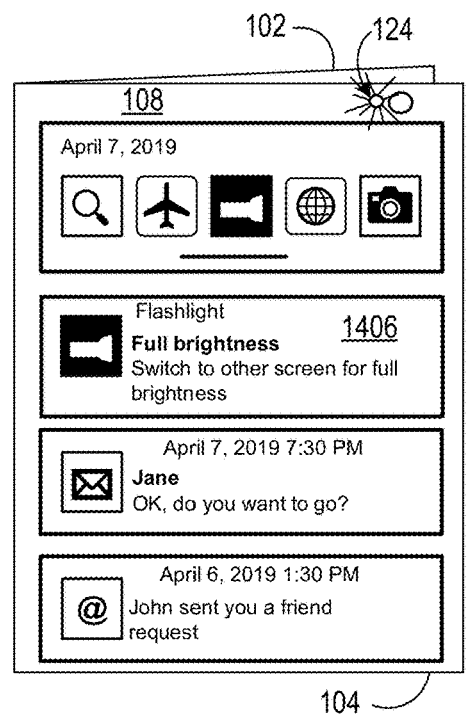
Figure 14B:
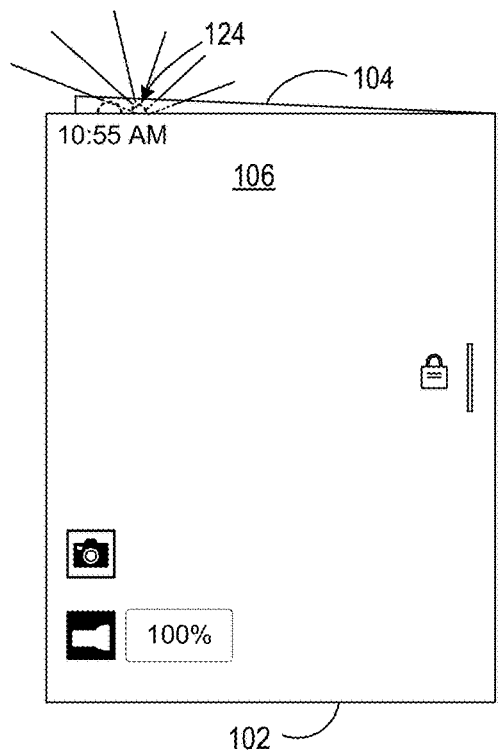
Figure 14D:
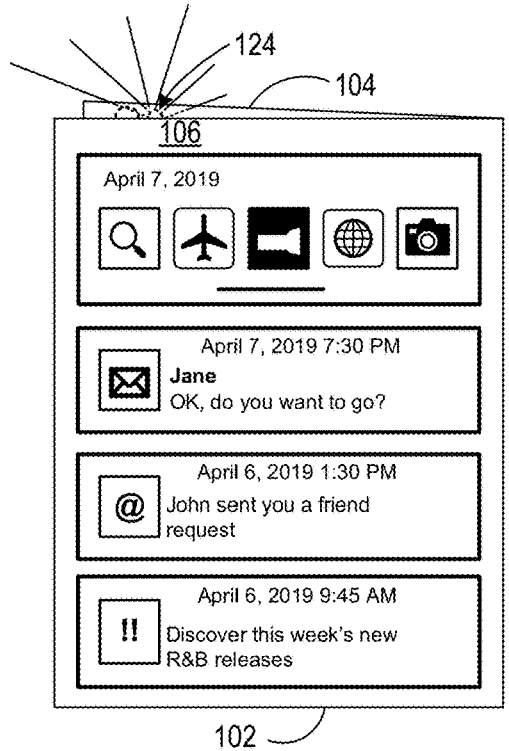

When a user turns on the flashlight and the flash hardware 124 is user-facing (e.g. the first portion 102 is folded behind the second portion 104 from a perspective of a user), the flash 124 enters the flashlight mode at low brightness, as shown in FIGS. 14A and 14C. Further, the computing device may output a notification directing a user to switch displays for full flashlight brightness. In FIG. 14A, the flashlight is launched when the computing device is in a locked state, and the computing device outputs a notification 1404 to the lock screen directing the user to fold the second portion 104 behind the first portion 102 for full flashlight brightness. As shown in FIG. 14B, flashlight brightness is 100% when the flash 124 is moved to a world-facing direction. In FIG. 14C, the flashlight is launched from a notification/action center while the computing device is in an unlocked state, and the computing device outputs a notification 1406 in the notification/action center directing the user to switch screens for full flashlight brightness. Once the user rotates the computing device 100 such that the flash 124 is directed away from the user, the computing device 100 adjusts the flashlight brightness to 100%, as shown in FIG. 14D. When a user launches a flashlight application and the flash 124 is already in a world-facing direction, such as in the examples of FIGS. 14B and 14D, the flash 124 may initiate at full or near-full flashlight brightness.

FIGS. 15A-15C depict an example use scenario for operating a flashlight application when a computing device is in a flip mode, single portrait configuration in which the flash 124 is world-facing. At FIG. 15A, the flash is off. At FIG. 15B, a user opens a notification/action center, which includes the user interface element 1102 for invoking a flashlight mode (e.g. by launching a flashlight application). At FIG. 15C, a user selects the user interface element 1102, which turns on the flash. In this example, the flash 124 is world-facing (e.g. as determined from data received from motion sensors on each portion 102 and 104 and also information indicating most recent screen interactions) and initiates a flashlight mode at full brightness. A similar sequence of events may occur when the computing device is in a single landscape configuration in which the flash 124 is world-facing.

FIGS. 16A-16E depicts an example use scenario for operating a flashlight application when a computing device is in a single portrait or single landscape configuration in which the flash 124 is user-facing. Similar to the scenario depicted in FIGS. 15A-15C, the flash is off at FIG. 16A. At FIG. 16B, a user opens a notification/action center. At FIG. 16C, the user selects the user interface element 1102, which invokes the flashlight application. However, in this scenario, the flash 124 is user-facing (e.g. as determined from motion sensors on each portion 102 and 104 and information regarding most recent screen interactions) and initiates a flashlight mode at a low/partial brightness. At FIG. 16D, the user turns around the computing device such that the flash 124 transitions to a world-facing direction. The computing device detects the resulting change in orientation of each portion 102 and 104 via motion sensor data and displays a notification 1602 on the user-facing display 106 (previously world-facing) requesting that the user activate the display. Once the user provides touch input to the display 106 or otherwise confirms intent to active the display 106, the computing device 100 displays the user notification/action center on the user-facing display 106 and increases the flashlight brightness, as indicated at FIG. 16E.

In the examples of FIGS. 16C-16E, the flash 124 is active during a detected device flip transition. When the flash 124 is active, user interface controls for a flashlight application may automatically switch from one display screen to the other display screen—without user input confirming intent to change display screens—in response to a detected device flip transition. In other examples, a user may be prompted to provide input (e.g. touch input, such as a tap or double tap on a display screen), to switch which display screen displays user interface flashlight controls. This may help to prevent accidental screen switching when the computing device 100 is in a single-screen pose (single portrait or single landscape).

When the flashlight is on and the computing device 100 is in an unlocked state, a brightness of the flash 124 in flashlight mode changes based upon changes in pose of the computing device. FIGS. 17A-17B depict an example use scenario in which a user moves a computing device 100 from a flip mode, single portrait (or landscape) configuration in which the flash 124 is world-facing to a double portrait (or landscape) configuration in which the flash 124 is user-facing. At FIG. 17A, the flash 124 is at full flashlight brightness while the computing device 100 is in the flip mode, single portrait configuration and the flash 124 is world-facing. As a user "unfolds" the computing device 100 from the flip mode, single portrait configuration to the double portrait configuration shown at FIG. 17B, the flashlight brightness dims as the hinge angle decreases.

Flashlight brightness also changes as a user moves the computing device from the double portrait (or landscape) configuration to the single portrait (or landscape) configuration to rotate the flash to an outward-facing pose when the computing device is in a locked state. FIGS. 18A-18D depicts an example use scenario in which, at FIG. 18A, the computing device 100 is in the double portrait configuration and the locked state. At FIG. 18B, a user turns on the flashlight by selecting the user interface element 204, which initiates the flashlight at low brightness. On the lock screen, the computing device 100 displays a notification 1802 instructing the user to fold back the second portion 104 to increase flashlight brightness. The user rotates the second portion 104 counterclockwise, at FIG. 18C, and flashlight brightness increases with increasing hinge angle. The computing device 100 also displays a brightness level indication 1804 to inform a user of a current flashlight brightness. At FIG. 18D, the flashlight operates at full brightness when the computing device 100 is in the single portrait configuration and the flash 124 is world-facing.

As mentioned above, the computing device 100 automatically adjusts a brightness of a flashlight based upon changes in pose and hinge angle θ. The computing device 100 controls the brightness of the flashlight to illuminate the flash at a relatively lower brightness (e.g. 0-20% full brightness) when the computing device 100 is in the double portrait and double landscape configurations, and at a relatively higher brightness (90-100% full brightness) when the computing device is in the single portrait and single landscape configurations and the flashlight is facing away from the user (e.g. as determined from motion sensors on each portion 102 and 104 and also information indicating most recent screen interactions). For hinge angles in a range between a double portrait/landscape configuration and a single portrait landscape configuration, the computing device 100 may control the flashlight to exhibit a brightness in a range of brightness values between the lowest brightness setting and the highest brightness setting.

Adjustments to light source brightness may be continuous as the hinge angle increases or decreases, or may be incremental. In a more specific example, a computing device in a double portrait or double landscape configuration may not increase flashlight brightness from the low brightness value to a higher brightness value until the computing device detects a threshold increase, e.g. 10 degrees, in the hinge angle θ, and then may increase flashlight brightness continuously or in increments as the hinge angle increases further.

Figure 19E:
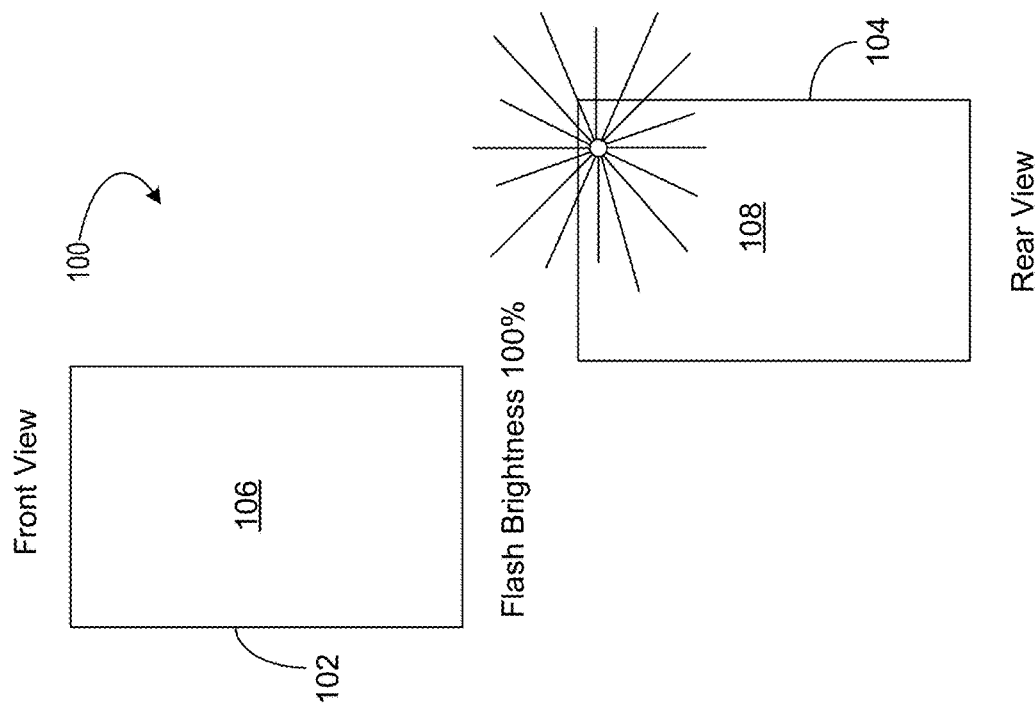
Figure 19D:
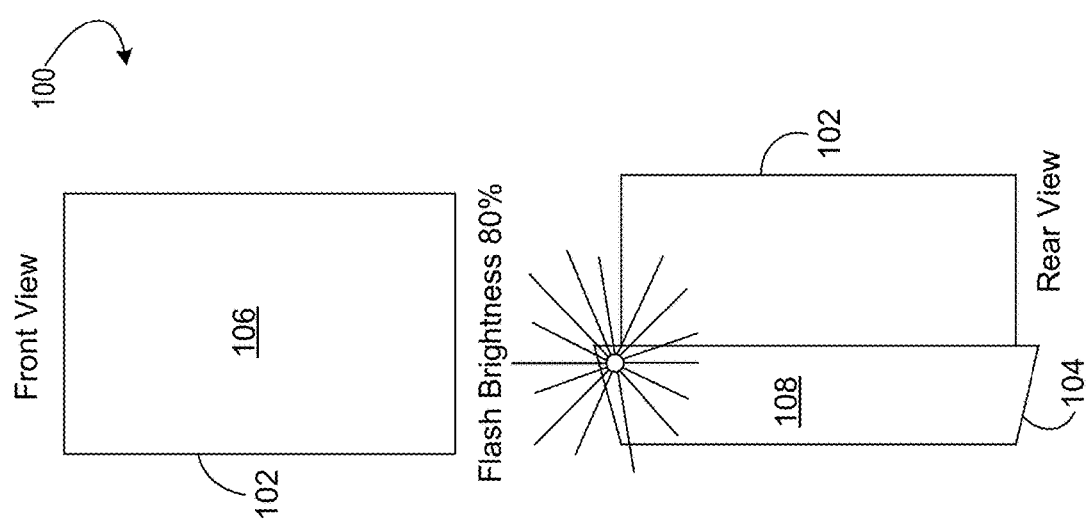

FIGS. 19A-19E depict the computing device 100 automatically adjusting flashlight brightness based upon changing hinge angle. In FIG. 19A, the computing device is in a double portrait configuration and the light source brightness is 20% of full brightness. The hinge angle increases to the pose shown in FIG. 19B, and the flashlight brightness increases to 40% of full brightness. The hinge angle increases again to the pose shown in FIG. 19C, and the flashlight brightness increase to 60% of full brightness. As shown FIG. 19D, further increases in the hinge angle cause the computing device to further increase the light source brightness. In FIG. 19E, the computing device is in a single portrait configuration and the flashlight brightness is 100% of full brightness.

As mentioned above, the computing device described herein further is configured to decrease flashlight brightness as hinge angle decreases. In the example of FIGS. 19A-19E, the computing device decreases flashlight brightness from 100% to 80% upon detecting the change in hinge angle as the computing device 100 transitions from the single portrait pose shown in FIG. 19E to the pose shown in FIG. 19D.

In some embodiments, the methods and processes described herein may be tied to a computing system of one or more computing devices. In particular, such methods and processes may be implemented as a computer-application program or service, an application-programming interface (API), a library, and/or other computer-program product.

Figure 20:
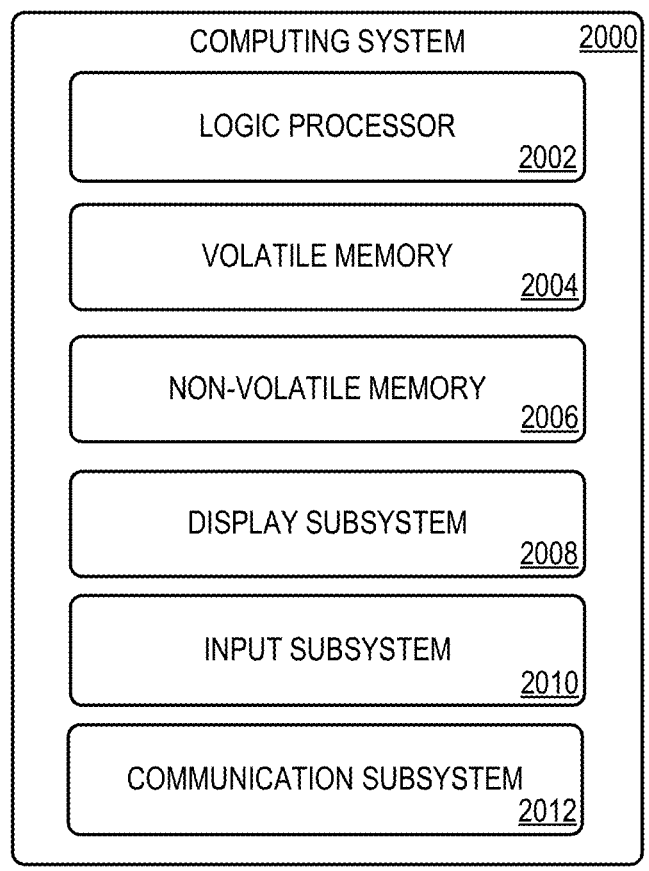
FIG. 20 is a block diagram illustrating an example computing system.

FIG. 20 schematically shows a non-limiting example of a computing system 2000 that can enact one or more of the methods and processes described above. Computing system 2000 is shown in simplified form. Computing system 2000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 2000 includes a logic processor 2002 volatile memory 2004, and a non-volatile storage device 2006. Computing system 2000 may optionally include a display subsystem 2008, input subsystem 2010, communication subsystem 2012, and/or other components not shown in FIG. 20.

Logic processor 2002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 2002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 2006 includes one or more physical devices configured to hold instructions executable by the logic processors to implement the methods and processes described herein. When such methods and processes are implemented, the state of non-volatile storage device 2006 may be transformed—e.g., to hold different data.

Non-volatile storage device 2006 may include physical devices that are removable and/or built-in. Non-volatile storage device 2006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 2006 may include nonvolatile, dynamic, static, read/write, read-only, sequential-access, location-addressable, file-addressable, and/or content-addressable devices. It will be appreciated that non-volatile storage device 2006 is configured to hold instructions even when power is cut to the non-volatile storage device 2006.

Volatile memory 2004 may include physical devices that include random access memory. Volatile memory 2004 is typically utilized by logic processor 2002 to temporarily store information during processing of software instructions. It will be appreciated that volatile memory 2004 typically does not continue to store instructions when power is cut to the volatile memory 2004.

Aspects of logic processor 2002, volatile memory 2004, and non-volatile storage device 2006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2000 typically implemented in software by a processor to perform a particular function using portions of volatile memory, which function involves transformative processing that specially configures the processor to perform the function. Thus, a module, program, or engine may be instantiated via logic processor 2002 executing instructions held by non-volatile storage device 2006, using portions of volatile memory 2004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 2008 may be used to present a visual representation of data held by non-volatile storage device 2006. The visual representation may take the form of a graphical user interface (GUI). As the herein described methods and processes change the data held by the non-volatile storage device, and thus transform the state of the non-volatile storage device, the state of display subsystem 2008 may likewise be transformed to visually represent changes in the underlying data. Display subsystem 2008 may include one or more display devices utilizing virtually any type of technology. Such display devices may be combined with logic processor 2002, volatile memory 2004, and/or non-volatile storage device 2006 in a shared enclosure, or such display devices may be peripheral display devices.

When included, input subsystem 2010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 2012 may be configured to communicatively couple various computing devices described herein with each other, and with other devices. Communication subsystem 2012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 2000 to send and/or receive messages to and/or from other devices via a network such as the Internet.

Another example provides a computing device comprising a first portion comprising a first display, a second portion comprising a second display and a camera, the second portion connected to the first portion via a hinge, a hinge angle sensing mechanism comprising one or more sensors, a logic device, and a storage device holding instructions executable by the logic device to execute a camera application and to receive sensor data from the one or more sensors, based at least in part on the sensor data received from the one or more sensors, determine a device pose, output the camera application to the first display when the device pose is indicative of the camera being world-facing, and output the camera application to the second display when the device pose is indicative of the camera being user-facing. In such an example, the instructions may additionally or alternatively be executable to detect a change in device pose, and when the change in device pose is indicative of a camera direction changing from a world-facing direction to a user-facing direction, then move the camera application from the first display to the second display. In such an example, the instructions may additionally or alternatively be executable to detect a change in device pose, and when the change in device pose is indicative of a camera direction changing from a user-facing direction to a world-facing direction, then move the camera application from the second display to the first display. In such an example, the device pose is indicative of the camera being user-facing and also indicative of the computing device being in a double portrait or double landscape configuration, and the instructions may additionally or alternatively be executable to receive a user input to move the camera application from the second display to the first display, and in response to receiving the user input, moving the camera application from the second display to the first display. In such an example, the device pose is indicative of the camera being user-facing and also indicative of the computing device being in a double portrait or double landscape configuration, and the instructions may additionally or alternatively be executable to receive a user input moving the camera application to a location spanning each of the first display and the second display, and in response to the user input, outputting the camera application in a spanning mode. In such an example, the instructions may additionally or alternatively be executable to output the camera application in the spanning mode by outputting a camera stream to one of the first display and the second display and outputting a camera roll of captured photos to the other of the first display and the second display. In such an example, the instructions may additionally or alternatively be executable to receive, via one of the first display and the second display, a touch input to launch the camera application, and in response to receiving the touch input, outputting the camera application to the one of the first display and the second display. In such an example, the instructions may additionally or alternatively be executable to receive the sensor data by receiving sensor data indicative of a transition in device pose compared to an initial device pose at which the touch input was received.

Another example provides a method enacted on a computing device comprising a first portion including a first display, a second portion including a second display and a camera, the second portion connected to the first portion via a hinge, and a hinge angle sensing mechanism comprising one or more sensors, the method comprising receiving, at one of the first display and the second display, an input to launch a camera application, in response to receiving the input, outputting the camera application to the one of the first display and the second display, receive sensor data from the one or more sensors, based at least in part on the sensor data received from the one or more sensors, determine a change in pose of the computing device, and based at least in part on the change in pose of the computing device, output the camera application to the other of the first display and the second display to maintain a user-facing orientation. In such an example, the change in device pose is indicative of the camera changing from a user-facing direction to a world-facing direction, and outputting the camera application to the other of the first display and the second display may additionally or alternatively comprise moving the camera application from the second display to the first display. In such an example, moving the camera application from the second display to the first display further may additionally or alternatively comprise powering off the second display. In such an example, determining the change in device pose may additionally or alternatively comprise determining a transition from a double portrait or double landscape device pose to a single portrait or single landscape device pose. In such an example, determining the change in device pose may additionally or alternatively comprise determining a rotation of the computing device in a single portrait or single landscape device pose such that the camera transitions from a user-facing direction to a world-facing direction or vice versa.

Another example provides a computing device comprising a first portion, a second portion comprising a light source, the second portion connected to the first portion via a hinge, a hinge angle sensing mechanism comprising one or more sensors, a logic device, and a storage device holding instructions executable by the logic device to execute a flashlight application and to receive sensor data from the one or more sensors, based at least in part on the sensor data received from the one or more sensors, determine a pose of the computing device, control the light source to emit light at a relatively lower brightness when the pose of the computing device is indicative of the light source being user-facing, and control the light source to emit light at a relatively higher brightness when the pose of the computing device is indicative of the light source being world-facing. In such an example, the instructions may additionally or alternatively be executable to detect a change in pose of the computing device, when the change in the pose is indicative of a direction of the light source changing from a world-facing direction to a user-facing direction, decrease a brightness of the light source, and when the change in the pose is indicate of the direction of the light source changing from the user-facing direction to the world-facing direction, increase the brightness of the light source. In such an example, the instructions may additionally or alternatively be executable to dynamically adjust the brightness of the light source during the change in pose of the computing device. In such an example, the instructions may additionally or alternatively be executable to increase or decrease the brightness of the light source when a change in hinge angle exceeds a threshold hinge angle. In such an example, the first portion may additionally or alternatively comprise a first display and the second portion may additionally or alternatively comprise a second display. In such an example, the instructions may additionally or alternatively be executable to output a brightness indicator via at least one display of the first display and the second display. In such an example, the instructions may additionally or alternatively be executable to, when the pose of the computing device is indicative of the light source being user-facing, output via at least one of the first display and the second display a notification instructing a user to change the pose of the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a first portion comprising a first display;
a second portion comprising a second display and a camera, the second portion connected to the first portion via a hinge;
a hinge angle sensing mechanism comprising one or more sensors;
a logic device; and
a storage device holding instructions executable by the logic device to execute a camera application and to
receive sensor data from the one or more sensors;
receive, at the first display or the second display, a user input to launch the camera application;
based at least in part on the sensor data received from the one or more sensors and screen interaction information indicating which of the first display or the second display is used to launch the camera application, determine a device pose;
output the camera application to the first display when the device pose is indicative of the camera being world-facing; and
output the camera application to the second display when the device pose is indicative of the camera being user-facing.

2. The computing device of claim 1, wherein the instructions are further executable to
detect a change in device pose; and
when the change in device pose is indicative of a camera direction changing from a world-facing direction to a user-facing direction, then move the camera application from the first display to the second display.

3. The computing device of claim 1, wherein the instructions are further executable to:
detect a change in device pose; and
when the change in device pose is indicative of a camera direction changing from a user-facing direction to a world-facing direction, then move the camera application from the second display to the first display.

4. The computing device of claim 1, wherein the device pose is indicative of the camera being user-facing and also indicative of the computing device being in a double portrait or double landscape configuration, and wherein the instructions are further executable to:
receive a user input to move the camera application from the second display to the first display; and
in response to receiving the user input, moving the camera application from the second display to the first display.

5. The computing device of claim 1, wherein the device pose is indicative of the camera being user-facing and also indicative of the computing device being in a double portrait or double landscape configuration, and wherein the instructions are further executable to:
receive a user input moving the camera application to a location spanning each of the first display and the second display; and
in response to the user input, outputting the camera application in a spanning mode.

6. The computing device of claim 5, wherein the instructions are executable to output the camera application in the spanning mode by outputting a camera stream to one of the first display and the second display and outputting a camera roll of captured photos to the other of the first display and the second display.

7. The computing device of claim 1, wherein the instructions are further executable to:
receive, via one of the first display and the second display, a touch input to launch the camera application; and
in response to receiving the touch input, outputting the camera application to the one of the first display and the second display.

8. The computing device of claim 7, wherein the instructions are executable to receive the sensor data by receiving sensor data indicative of a transition in the device pose compared to an initial device pose at which the touch input was received.

9. A method enacted on a computing device comprising a first portion including a first display, a second portion including a second display and a camera, the second portion connected to the first portion via a hinge, and a hinge angle sensing mechanism comprising one or more sensors, the method comprising:
receiving, at one of the first display and the second display, an input to launch a camera application;

receiving sensor data from the one or more sensors;

based at least in part on the sensor data and screen interaction information indicating which of the first display or the second display is used to launch the camera application, determining a device pose;

outputting the camera application to the first display when the device pose is indicative of the camera being world-facing; and outputting the camera application to the second display when the device pose is indicative of the camera being user-facing.

10. The method of claim 9, further comprising determining a change in device pose, wherein the change in device pose is indicative of the camera changing from a user-facing direction to a world-facing direction, and wherein outputting the camera application to the other of the first display and the second display comprises moving the camera application from the second display to the first display.

11. The method of claim 10, wherein moving the camera application from the second display to the first display further comprises powering off the second display.

12. The method of claim 9, further comprising determining a change in device pose, wherein determining the change in device pose comprises determining a transition from a double portrait or double landscape device pose to a single portrait or single landscape device pose.

13. The method of claim 9, further comprising determining a change in device pose, wherein determining the change in device pose comprises determining a rotation of the computing device in a single portrait or single landscape device pose such that the camera transitions from a user-facing direction to a world-facing direction or vice versa.

* * * * *